(12) United States Patent
Jung et al.

(10) Patent No.: US 10,687,245 B2
(45) Date of Patent: Jun. 16, 2020

(54) APPARATUS AND METHOD FOR TRANSMITTING/RECEIVING DATA IN AN ELECTRONIC DEVICE

(71) Applicant: Samsung Electronics Co., Ltd, Gyeonggi-do (KR)

(72) Inventors: Bu-Seop Jung, Gyeonggi-do (KR); Bum-Jib Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 16 days.

(21) Appl. No.: 15/432,900

(22) Filed: Feb. 14, 2017

(65) Prior Publication Data

US 2017/0245174 A1    Aug. 24, 2017

(30) Foreign Application Priority Data

Feb. 18, 2016 (KR) .................. 10-2016-0019124

(51) Int. Cl.
| | |
|---|---|
| *H04W 28/06* | (2009.01) |
| *H04L 29/06* | (2006.01) |
| *H04W 52/02* | (2009.01) |
| *H04L 29/08* | (2006.01) |
| *H04W 28/12* | (2009.01) |

(52) U.S. Cl.
CPC ......... *H04W 28/06* (2013.01); *H04L 67/1095* (2013.01); *H04L 67/38* (2013.01); *H04W 28/12* (2013.01); *H04W 52/0216* (2013.01); *H04W 52/0229* (2013.01); *Y02D 70/00* (2018.01); *Y02D 70/1242* (2018.01); *Y02D 70/1262* (2018.01); *Y02D 70/142* (2018.01);

*Y02D 70/144* (2018.01); *Y02D 70/164* (2018.01); *Y02D 70/166* (2018.01); *Y02D 70/168* (2018.01); *Y02D 70/20* (2018.01); *Y02D 70/22* (2018.01); *Y02D 70/26* (2018.01)

(58) Field of Classification Search
CPC ........................... H04W 28/06; H04L 67/1095
See application file for complete search history.

(56) References Cited

U.S. PATENT DOCUMENTS

| | | | |
|---|---|---|---|
| 8,525,869 B2 | 9/2013 | Kim et al. | |
| 8,867,501 B2 | 10/2014 | Wang et al. | |
| 10,019,444 B2* | 7/2018 | Schmidt | G06F 16/48 |
| 2009/0298490 A9* | 12/2009 | Janik | H04L 12/2856 |
| | | | 455/419 |
| 2010/0105315 A1* | 4/2010 | Albrett | G06Q 30/02 |
| | | | 455/3.04 |
| 2012/0163261 A1 | 6/2012 | Vedantham et al. | |

(Continued)

FOREIGN PATENT DOCUMENTS

JP     2012529791 A    11/2012

*Primary Examiner* — Rhonda L Murphy

(57) ABSTRACT

An apparatus and a method for transmitting and/or receiving data in an electronic device are provided. According to an embodiment, an electronic device includes a communication module and a processor. When the electronic device outputs content, the processor can transmit the content to an external electronic device using the communication module, detect a state of the electronic device in relation to the output, select substitute content for the content at least based on the detection, determine a schedule corresponding to the substitute content, and transmit the substitute content to the external electronic device based on the schedule.

20 Claims, 25 Drawing Sheets

(56) References Cited

U.S. PATENT DOCUMENTS

| | | | | |
|---|---|---|---|---|
| 2013/0254159 A1* | 9/2013 | Thramann | ......... | G06F 17/30053 |
| | | | | 707/609 |
| 2014/0189724 A1* | 7/2014 | Harkness | ............... | H04H 20/31 |
| | | | | 725/18 |
| 2014/0321378 A1* | 10/2014 | Zhang | ................... | H04L 67/322 |
| | | | | 370/329 |

* cited by examiner

APPARATUS AND METHOD FOR TRANSMITTING/RECEIVING DATA IN AN ELECTRONIC DEVICE

CROSS-REFERENCE TO RELATED APPLICATION(S) AND CLAIM OF PRIORITY

The present application is related to and claims the benefit under 35 U.S.C. § 119(a) to a Korean patent application filed in the Korean Intellectual Property Office on Feb. 18, 2016, and assigned Serial No. 10-2016-0019124, the entire disclosure of which is hereby incorporated by reference.

TECHNICAL FIELD

The present disclosure relates generally to an apparatus and a method for transmitting and/or receiving data in an electronic device.

BACKGROUND

With advances in wired/wireless communication networks, electronic devices which display data visually recognized by a user on a display can be interconnected over the wired/wireless communication network.

The electronic devices can transmit and receive various data over the wired/wireless communication network, and one electronic device can remotely control another electronic device. Alternatively, one electronic device can share data with another electronic device. Such a service for the remote control or the data sharing between the electronic devices can include a mirroring service.

As such, during the mirroring service, the electronic devices can transmit substitute data instead of mirroring data. Although the substitute data requires less resource than the mirroring data in the transmission, current consumption of the electronic devices in the substitute data transmission is almost similar to current consumption of the mirroring data transmission and accordingly unnecessary current can be consumed.

SUMMARY

To address the above-discussed deficiencies of the prior art, it is a primary object of the present disclosure to provide an apparatus and its operating method for minimizing current consumption in substitute data transmission.

According to one aspect of the present disclosure, an electronic device includes a communication module and a processor. When the electronic device outputs content, the processor can transmit the content to an external electronic device using the communication module, detect a state of the electronic device in relation to the output, select substitute content for the content at least based on the detection, determine a schedule corresponding to the substitute content, and transmit the substitute content to the external electronic device based on the schedule.

According to another aspect of the present disclosure, a method for operating an electronic device can include, when outputting content, transmitting the content to an external electronic device, detecting a state of the electronic device in relation to the output, selecting substitute content for the content at least based on the state of the electronic device, determining a schedule corresponding to the substitute content, and transmitting the substitute content to the external electronic device based on the schedule.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION

Figure 1:
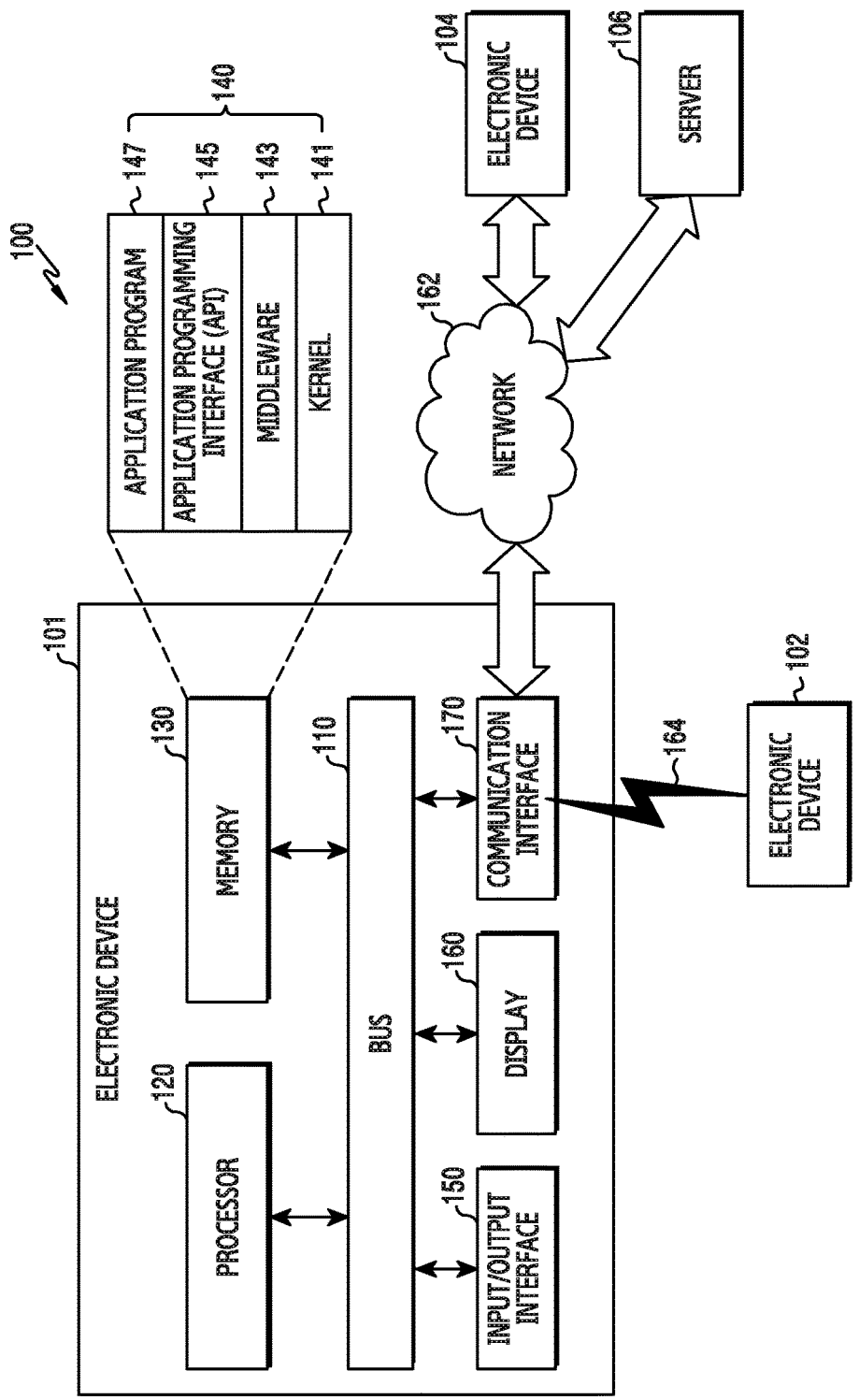
FIG. 1 illustrates a block diagram of an electronic device in a network according to various embodiments of the present disclosure.

FIGS. 1 through 23, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Hereinafter, various embodiments of the present disclosure will be described with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

The present disclosure may have various embodiments, and modifications and changes may be made therein. Therefore, the present disclosure will be described in detail with reference to particular embodiments shown in the accompanying drawings. However, it should be understood that the present disclosure is not limited to the particular embodiments, but includes all modifications/changes, equivalents, and/or alternatives falling within the spirit and the scope of the present disclosure. In describing the drawings, similar reference numerals may be used to designate similar elements.

The terms "have", "may have", "include", or "may include" used in the various embodiments of the present disclosure indicate the presence of disclosed corresponding functions, operations, elements, and the like, and do not limit additional one or more functions, operations, elements, and the like. In addition, it should be understood that the terms "include" or "have" used in the various embodiments of the present disclosure are to indicate the presence of features, numbers, steps, operations, elements, parts, or a combination thereof described in the specifications, and do not preclude the presence or addition of one or more other features, numbers, steps, operations, elements, parts, or a combination thereof.

The terms "A or B", "at least one of A or/and B" or "one or more of A or/and B" used in the various embodiments of the present disclosure include any and all combinations of words enumerated with it. For example, "A or B", "at least one of A and B" or "at least one of A or B" means (1) including at least one A, (2) including at least one B, or (3) including both at least one A and at least one B.

Although the term such as "first" and "second" used in various embodiments of the present disclosure may modify various elements of various embodiments, these terms do not limit the corresponding elements. For example, these terms do not limit an order and/or importance of the corresponding elements. These terms may be used for the purpose of distinguishing one element from another element. For example, a first user device and a second user device all indicate user devices and may indicate different user devices. For example, a first element may be named a second element without departing from the scope of right of various embodiments of the present disclosure, and similarly, a second element may be named a first element.

It will be understood that when an element (e.g., first element) is "connected to" or "(operatively or communicatively) coupled with/to" to another element (e.g., second element), the element may be directly connected or coupled to another element, and there may be an intervening element (e.g., third element) between the element and another element. To the contrary, it will be understood that when an element (e.g., first element) is "directly connected" or "directly coupled" to another element (e.g., second element), there is no intervening element (e.g., third element) between the element and another element.

The expression "configured to (or set to)" used in various embodiments of the present disclosure may be replaced with "suitable for", "having the capacity to", "designed to", "adapted to", "made to", or "capable of" according to a situation. The term "configured to (set to)" does not necessarily mean "specifically designed to" in a hardware level. Instead, the expression "apparatus configured to . . . " may mean that the apparatus is "capable of . . . " along with other devices or parts in a certain situation. For example, "a processor configured to (set to) perform A, B, and C" may be a dedicated processor, e.g., an embedded processor, for performing a corresponding operation, or a generic-purpose processor, e.g., a Central Processing Unit (CPU) or an application processor (AP), capable of performing a corresponding operation by executing one or more software programs stored in a memory device.

The terms as used herein are used merely to describe certain embodiments and are not intended to limit the present disclosure. As used herein, singular forms may include plural forms as well unless the context explicitly indicates otherwise. Further, all the terms used herein, including technical and scientific terms, should be interpreted to have the same meanings as commonly understood by those skilled in the art to which the present disclosure pertains, and should not be interpreted to have ideal or excessively formal meanings unless explicitly defined in various embodiments of the present disclosure.

An electronic device according to various embodiments of the present disclosure may be a device. For example, the electronic device according to various embodiments of the present disclosure may include at least one of: a smart phone; a tablet personal computer (PC); a mobile phone; a video phone; an e-book reader; a desktop PC; a laptop PC; a netbook computer; a workstation, a server, a personal digital assistant (PDA); a portable multimedia player (PMP); an MP3 player; a mobile medical device; a camera; or a wearable device (e.g., a head-mount-device (HMD), an electronic glasses, an electronic clothing, an electronic bracelet, an electronic necklace, an electronic appcessory, an electronic tattoo, a smart mirror, or a smart watch).

In other embodiments, an electronic device may be a smart home appliance. For example, of such appliances may include at least one of: a television (TV); a digital video disk (DVD) player; an audio component; a refrigerator; an air conditioner; a vacuum cleaner; an oven; a microwave oven; a washing machine; an air cleaner; a set-top box; a home automation control panel; a security control panel; a TV box (e.g., Samsung HomeSync®, Apple TV®, or Google TV®); a game console (e.g., Xbox®, PlayStation®); an electronic dictionary; an electronic key; a camcorder; or an electronic frame.

In other embodiments, an electronic device may include at least one of: a medical equipment (e.g., a mobile medical device (e.g., a blood glucose monitoring device, a heart rate monitor, a blood pressure monitoring device or a temperature meter), a magnetic resonance angiography (MRA) machine, a magnetic resonance imaging (MM) machine, a computed tomography (CT) scanner, or an ultrasound machine); a navigation device; a global positioning system (GPS) receiver; an event data recorder (EDR); a flight data recorder (FDR); an in-vehicle infotainment device; an electronic equipment for a ship (e.g., ship navigation equipment and/or a gyrocompass); an avionics equipment; a security equipment; a head unit for vehicle; an industrial or home robot; an automatic teller's machine (ATM) of a financial institution, point of sale (POS) device at a retail store, or an internet of things device (e.g., a Lightbulb, various sensors, an electronic meter, a gas meter, a sprinkler, a fire alarm, a thermostat, a streetlamp, a toaster, a sporting equipment, a hot-water tank, a heater, or a boiler and the like)

In certain embodiments, an electronic device may include at least one of: a piece of furniture or a building/structure; an electronic board; an electronic signature receiving device; a projector; and various measuring instruments (e.g., a water meter, an electricity meter, a gas meter, or a wave meter).

An electronic device according to various embodiments of the present disclosure may also include a combination of one or more of the above-mentioned devices. Further, it will be apparent to those skilled in the art that an electronic device according to various embodiments of the present disclosure is not limited to the above-mentioned devices.

FIG. 1 illustrates a view illustrating a network environment 100 including an electronic device 101 according to various embodiments. Referring to FIG. 1, the electronic device 101 may include a bus 110, a processor 120, a memory 130, an input/output (I/O) interface 150, a display 160, and a communication interface 170.

The bus 110 may be a circuit for connecting the above-described elements (e.g., the processor 120, the memory 130, the I/O interface 150, the display 160 or the communication interface 170, etc.) with each other, and transferring communication (e.g., a control message) between the above-described elements.

The processor 120 may include a central processing unit (CPU), a communication processor (CP), a graphic processing unit (GPU).

The processor 120 may receive, for example, an instruction from the above-described other elements (e.g., the memory 130, the I/O interface 150, the display 160, or the communication interface 170, etc.) via the bus 110, decipher the received instruction, and execute an operation or a data process corresponding to the deciphered instruction.

The memory 130 may include any suitable type of volatile or non-volatile memory. The memory 130 may store an instruction or data received from the processor 120 or other elements (e.g., the I/O interface 150, the display 160, or the communication interface 170, etc.), or generated by the processor 120 or other elements. The memory 130 may include, for example, programming modules 140 such as a kernel 141, a middleware 143, an application programming interface (API) 145, or an application 147. The each of the programming modules may be configured using a software, a firmware, a hardware, or a combination of two or more of these.

The kernel 141 may control or manage system resources (e.g., the bus 110, the processor 120, or the memory 130, etc.) used for executing an operation or a function implemented in the rest of the programming modules, for example, the middleware 143, the API 145, or the application 147. Also, the kernel 141 may provide an interface for allowing the middleware 143, the API 145, or the application 147 to access an individual element of the electronic device 101 and control or manage the same.

The middleware 143 may perform a mediation role so that the API 145 or the application 147 may communicate with the kernel 141 to give and take data. Also, in connection with task requests received from the applications 147, the middleware 143 may perform a control (e.g., scheduling or load balancing) for a task request using, for example, a method of assigning priority that may use a system resource (e.g., the bus 110, the processor 120, or the memory 130, etc.) of the electronic device 101 to at least one application 134.

The API 145 is an interface for allowing the application 147 to control a function provided by the kernel 141 or the middleware 143, and may include at least one interface or function (e.g., an instruction) for file control, window control, image processing, or character control, etc.

The I/O interface 150 may transfer an instruction or data input from a user via an I/O unit (e.g., a sensor, a keyboard, or a touchscreen) to the processor 120, the memory 130, or the communication interface 170 via the bus 110, for example. For example, the I/O interface 150 may provide data regarding a user's touch input via the touchscreen to the processor 120. Also, the I/O interface 150 may, for example, output an instruction or data received via the bus 110 from the processor 120, the memory 130, or the communication interface 170 via the I/O unit (e.g., a speaker or a display). For example, the I/O interface 150 may output voice data processed by the processor 120 to a user via a speaker.

The display 160 may include, for example, a liquid crystal display (LCD), a light emitting diode (LED) display, an organic light emitting diode (OLED) display, a micro electro mechanical system (MEMS) display, or an electronic paper display. The display 160 may display various types of contents (for example, text, images, videos, icons, or symbols) for users. The display 160 may include a touch screen, and may receive, for example, a touch, gesture, proximity, or hovering input by using an electronic pen or a part of the user's body.

The communication interface 170 may connect communication between the electronic device 101 and an external device (for example, the electronic device 104 or the server 106). For example, the communication interface 170 may be connected to a network 162 through wireless communication or wired communication, and may communicate with an external device.

The wireless communication may use at least one of, for example, long term evolution (LTE), LTE-Advance (LTE-A), code division multiple access (CDMA), wideband CDMA (WCDMA), universal mobile telecommunications system (UMTS), WiBro (Wireless Broadband), and global system for mobile Communications (GSM) as a cellular communication protocol.

The wired communication may include, for example, at least one of universal serial bus (USB), high definition multimedia interface (HDMI), recommended standard 232 (RS-232), and plain old telephone service (POTS).

The network 162 may include at least one of communication networks such as a computer network (for example, a LAN or a WAN), the Internet, and a telephone network.

The electronic devices 102 and 104 may be devices of the same type as that the electronic device 101 or devices of different types from that of the electronic device 101. According to an embodiment, the server 106 may include a group of one or more servers. According to various embodiments, all or some of the operations executed in the electronic device 101 may be carried out in another electronic device or a plurality of electronic devices (for example, the electronic device 102 or 104 and the server 106). According to an embodiment, when the electronic device 101 may perform some functions or services automatically or by a request, the electronic device 101 may make a request for performing at least some functions related to the functions or services to another device (for example, the electronic device 102 or 104, or the server 106) instead of performing the functions or services by itself or additionally. The electronic device (for example, the electronic device 102 or 104, or the server 106) may carry out the functions requested by the electronic device 101 or additional functions and provide results thereof to the electronic device 101. The electronic device 101 may provide the requested functions or services to another electronic device based on the received results or after additionally processing the received results. To this end, for example, cloud computing, distributed computing, or client-server computing technology may be used.

Figure 2:
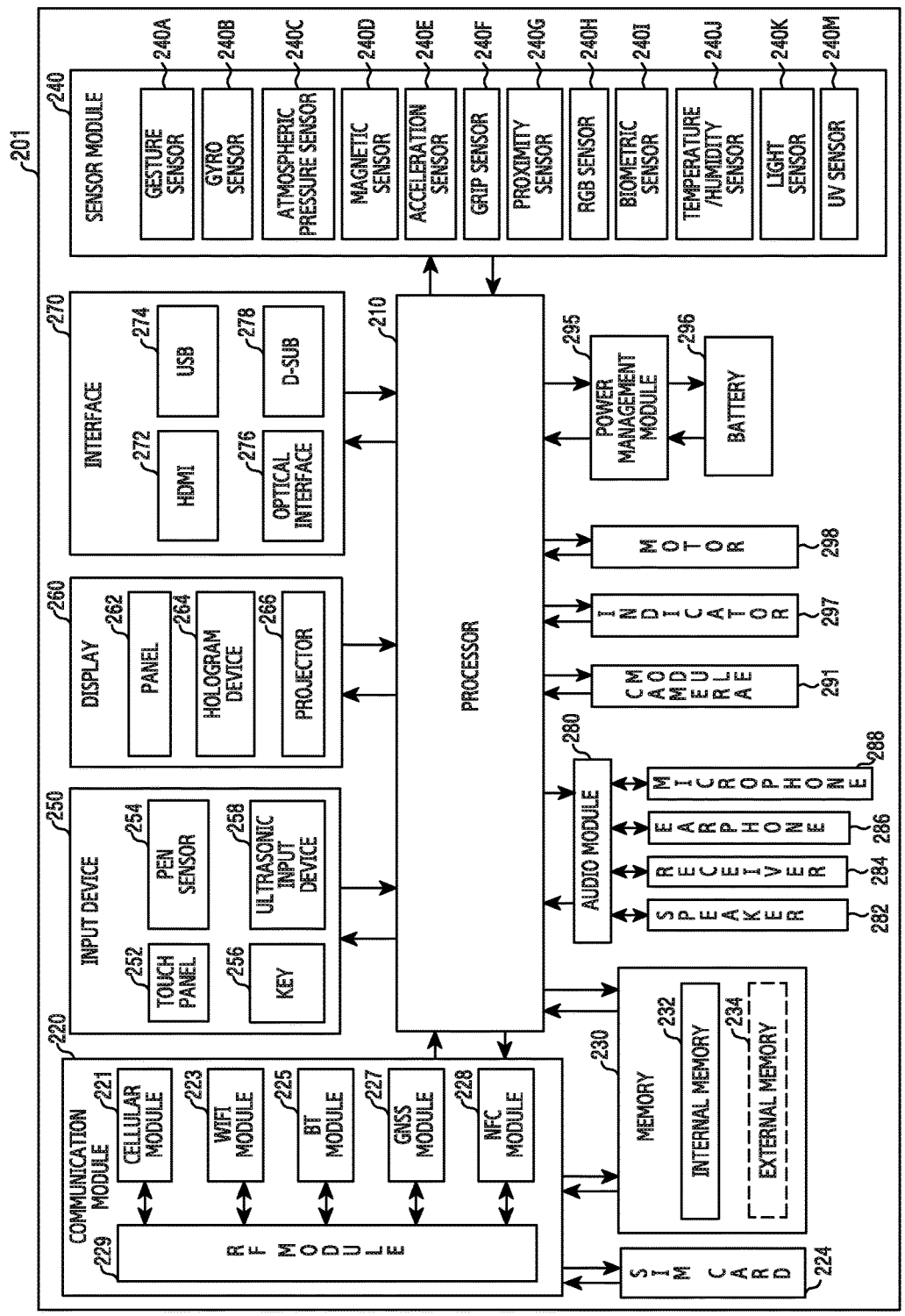
FIG. 2 illustrates a block diagram of an electronic device according to various embodiments of the present disclosure.

FIG. 2 illustrates a block diagram 200 illustrating an electronic device 201 according to various embodiments of the present disclosure. The electronic device 201 may configure, for example, all or a portion of the electronic device 21 illustrated in FIG. 1. Referring to FIG. 2, the electronic device 201 may include one or more application processors (AP) 210, a communication module 220, a subscriber identification module (SIM) card 224, a memory 230, a sensor 240, an input unit 250, a display 260, an interface 270, an audio module 280, a camera module 291, a power management module 295, a battery 296, an indicator 297, or a motor 298.

The AP 210 may drive an OS or an application to control a plurality of hardware or software elements connected to the AP 210, and perform various data processes including multimedia data and operations. The AP 210 may be implemented, for example, as a system on chip (SoC). According to an embodiment, the AP 210 may further include at least one of a graphic processing unit (GPU) or image signal processor. According to an embodiment, the AP 210 may be implemented to include at least a portion (e.g., the cellular module 221) of the above-described elements. Also, the AP 210 may stores data received from at least one of other elements or generated by at least one of other elements in a non-volatile memory.

The communication module 220 (e.g., the communication interface 160) may perform data transmission/reception in communication between the electronic device 201 (e.g., the electronic device 21) and other electronic devices (e.g., the electronic device 24 or the server 26) connected via a network. According to an embodiment, the communication module 220 may include a cellular module 221, a Wi-Fi module 223, a BT module 225, a GPS module 227, an NFC module 228, and a radio frequency (RF) module 229.

The cellular module 221 may provide voice communication, image communication, a short message service, or an Internet service, etc. via a communication network (e.g., LTE, LTE-A, CDMA, WCDMA, UMTS, WiBro, or GSM, etc.). Also, the cellular module 221 may perform discrimination and authentication of an electronic device within a communication network using, for example, a subscriber identify module (e.g., a SIM card 224). According to an embodiment, the cellular module 221 may perform at least a portion of functions that may be provided by the AP 210. According to an embodiment, the cellular module 221 may include a communication processor (CP). Also, the cellular module 221 may be, for example, implemented as a SoC. Though elements such as the cellular module 221 (e.g., a communication processor), the memory 230, or the power management module 295, etc. are illustrated as elements separated from the AP 210 in FIG. 2, according to an embodiment, the AP 210 may be implemented to include at least a portion (e.g., the cellular module 221) of the above-described elements.

Each of the Wi-Fi module 223, the BT module 225, the GPS module 227, or the NFC module 228 may include, for example, a processor for processing data transmitted/received via a relevant module. Though the cellular module 221, the Wi-Fi module 223, the BT module 225, the GPS module 227, or the NFC module 228 are illustrated as separate blocks in FIG. 2, according to an embodiment, at least a portion (e.g., two or more elements) of the cellular module 221, the Wi-Fi module 223, the BT module 225, the GPS module 227, or the NFC module 228 may be included in one Integrated Circuit (IC) or an IC package. For example, at least a portion (e.g., a communication processor corresponding to the cellular module 221 and a Wi-Fi processor corresponding to the Wi-Fi module 223) of processors corresponding to each of the cellular module 221, the Wi-Fi module 223, the BT module 225, the GPS module 227, or the NFC module 228 may be implemented as one SoC.

The RF module 229 may perform transmission/reception of data, for example, transmission/reception of an RF signal. The RF module 229 may include, for example, a transceiver, a power amp module (PAM), a frequency filter, or a low noise amplifier (LNA), etc., though not shown. Also, the RF module 229 may further include a part for transmitting/receiving an electromagnetic wave on a free space in wireless communication, for example, a conductor or a conducting line, etc. Though FIG. 2 illustrates the cellular module 221, the Wi-Fi module 223, the BT module 225, the GPS module 227, and the NFC module 228 share one RF module 229, according to an embodiment, at least one of the cellular module 221, the Wi-Fi module 223, the BT module 225, the GPS module 227, or the NFC module 228 may perform transmission/reception of an RF signal via a separate RF module.

The SIM card 224 may be a card including a subscriber identify module, and may be inserted into a slot formed in a specific position of the electronic device. The SIM card 224 may include unique identify information (e.g., integrated circuit card identifier (ICCID)) or subscriber information (e.g., international mobile subscriber identity (IMSI)).

The memory 230 (e.g., the memory 20) may include a built-in memory 232 or an external memory 234. The built-in memory 232 may include, for example, at least one of a volatile memory (e.g., dynamic RAM (DRAM), static RAM (SRAM), synchronous dynamic RAM (SDRAM)) and a non-volatile memory (e.g., one time programmable ROM (OTPROM), programmable ROM (PROM), erasable and programmable ROM (EPROM), electrically erasable and programmable ROM (EEPROM), mask ROM, flash ROM, NAND flash memory, NOR flash memory, etc.).

According to an embodiment, the built-in memory 232 may be a Solid State Drive (SSD). The external memory 234 may further include a flash drive, for example, compact flash (CF), secure digital (SD), micro secure digital (Micro-SD), mini secure digital (Mini-SD), extreme digital (xD), or a memory stick. The external memory 234 may be functionally connected with the electronic device 201 via various interfaces. According to an embodiment, the electronic device 201 may further include a storage device (or a storage medium) such as a hard drive.

The sensor module 240 may measure a physical quantity or detect an operation state of the electronic device 201, and convert the measured or detected information to an electric signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., RGB (red, green, blue) sensor), a living body sensor 240I, a temperature/humidity sensor 240J, an illuminance sensor 240K, or an ultra violet (UV) sensor 240M. Additionally or alternatively, the sensor module 240 may include, for example, an E-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), or a fingerprint sensor (not shown), etc. The sensor module 240 may further include a control circuit for controlling at least one sensor belonging thereto.

The input unit 250 may include a touch panel 252, a (digital) pen sensor 254, a key 256, or an ultrasonic input unit 258. The touch panel 252 may recognize a touch input using at least one of capacitive, resistive, infrared, or ultrasonic methods. Also, the touch panel 252 may further include a control circuit. A capacitive touch panel may perform detection by a physical contact or proximity recognition. The touch panel 252 may further include a tactile layer. In this case, the touch panel 252 may provide a tactile reaction to a user.

The (digital) pen sensor 254 may be implemented using, for example, a method which is the same as or similar to receiving a user's touch input, or using a separate sheet for detection. The key 256 may include, for example, a physical button, an optical key or keypad. The ultrasonic input unit 258 is a unit for recognizing data by detecting a sound wave using a microphone (e.g., a microphone 288) in the electronic device 201 via an input tool generating an ultrasonic signal, and enables wireless recognition. According to an embodiment, the electronic device 201 may receive a user input from an external device (e.g., a computer or a server) connected to the communication module 220 using the communication module 220.

The display 260 (e.g., the display 150) may include a panel 262, a hologram device 264, or a projector 266. The panel 262 may be, for example, a liquid crystal display (LCD), or an active-matrix organic light-emitting diode (AM-OLED), etc. The panel 262 may be implemented, for example, such that it is flexible, transparent, or wearable. The panel 262 may be configured as one module together with the touch panel 252. The hologram device 264 may show a three-dimensional image in the air using interferences of light. The projector 266 may project light onto a screen to display an image. The screen may be positioned, for example, inside or outside the electronic device 201. According to an embodiment, the display 260 may further include a control circuit for controlling the panel 262, the hologram device 264, or the projector 266.

The interface 270 may include, for example, a high-definition multimedia interface (HDMI) 272, a universal serial bus (USB) 274, an optical interface 276, or a D-sub-miniature (D-sub) 278. The interface 270 may be included, for example, in the communication interface 160 illustrated in FIG. 1. Additionally or alternatively, the interface 270 may include, for example, a mobile high-definition link (MHL) interface, a secure digital (SD) card/multi-media card (MMC) interface, or an infrared data association (IrDA) standard interface.

The audio module 280 may convert a sound and an electric signal in dual directions. At least a partial element of the audio module 280 may be included, for example, in the I/O interface 140 illustrated in FIG. 1. The audio module 280 may process sound information input or output via, for example, a speaker 282, a receiver 284, an earphone 286, or a microphone 288, etc.

The camera module 291 is a device that may shoot a still image and a moving picture. According to an embodiment, the camera module 291 may include one or more image sensors (e.g., a front sensor or a rear sensor), a lens (not shown), an image signal processor (ISP) (not shown), or a flash (not shown) (e.g., an LED or xenon lamp).

The power management module 295 may manage power of the electronic device 201. Though not shown, the power management module 295 may include, for example, a power management integrated circuit (PMIC), a charger integrated circuit (IC), or a battery or a battery or fuel gauge.

The PMIC may be mounted, for example, inside an integrated circuit or a SoC semiconductor. A charging method may be classified into a wired charging method and a wireless charging method. The charging IC may charge a battery and reduce an amount of or prevent introduction of an overvoltage or an overcurrent from a charger. According to an embodiment, the charging IC may include a charging IC for at least one of the wired charging method and the wireless charging method. The wireless charging method may be, for example, a magnetic resonance method, a magnetic induction method, or an electromagnetic wave method, etc., and may additionally include an additional circuit for wireless charging, for example, a circuit such as a coil loop, a resonance circuit, or a rectifier, etc.

The battery gauge may measure, for example, a remnant of the battery 296, a voltage, a current, or a temperature while charging. The battery 296 may store or generate electricity, and supply power to the electronic device 201 using the stored or generated electricity. The battery 296 may include, for example, a rechargeable battery or a solar battery.

The indicator 297 may display a specific state of the electronic device 201 or a portion thereof (e.g., the AP 210), for example, a booting state, a message state, or a charging state, etc. The motor 298 may convert an electric signal to mechanical vibration. Though not shown, the electronic device 201 may include a processor (e.g., a GPU) for supporting a mobile TV. The processor for supporting the mobile TV may process media data corresponding to standards, for example, such as digital multimedia broadcasting (DMB), digital video broadcasting (DVB), or a media flow, etc.

The aforementioned elements of the electronic device according to various embodiments of the present disclosure may be constituted by one or more components, and the name of the corresponding element may vary with a type of electronic device. The electronic device according to various embodiments of the present disclosure may include at least one of the aforementioned elements. Some elements may be omitted or other additional elements may be further included in the electronic device. Further, some of the components of the electronic device according to the various embodiments of the present disclosure may be combined to form a single entity, and thus, may equivalently execute functions of the corresponding elements prior to the combination.

According to an embodiment, the processor 210 can output and transmit content to the external electronic device (e.g., the external electronic device 102). For example, the processor 210 can provide a screen mirroring service to the external electronic device 102 using WiFi Direct communication.

According to an embodiment, the processor 210 can transmit content according to a schedule corresponding to the content. For example, the schedule (or schedule information) can be time information indicating an active interval and a sleep interval of a communication interface (e.g., the communication module 220 or the WIFI module 223 of the communication module 220) based on a preset period. For example, the schedule can be a proportion of the active interval and the sleep interval in a period. For example, the active interval can deliver data (e.g., content) by activating the communication module 220. For example, the sleep interval may not deliver data by deactivating the communication module 220 so as to minimize current consumption of the communication module 220.

According to an embodiment, the schedule corresponding to the content can include the proportion 1:0 of the active interval and the sleep interval of the period. For example, the schedule corresponding to the content can include only the active interval.

According to an embodiment, the processor 210 can detect a state of the electronic device 101 relating to the content output. For example, the state of the electronic device 101 can include an active state, an inactive state, a low-power state, or a power-on state or a power-off state of the display 260. For example, the state of the electronic device 101 can include a function state of the display 260, a content change, and a change of an application or a function (e.g., camera or call) which reproduces the content.

According to an embodiment, the processor 210 can select substitute content for the content based on the detected state of the electronic device 101. For example, the substitute content can be smaller than the content in size. For example, the substitute content can include an image, an audio, a video, or a combination of them.

According to an embodiment, when the display 260 is turned off, the processor 210 can select the substitute content for the content. For example, the substitute content can be preset or pre-selected. For example, the substitute content can be selected by a user from at least one content stored in the memory 230.

The electronic device 101 can determine the schedule corresponding to the selected substitute content. For example, the schedule corresponding to the selected substitute content can be designated or determined based on a property of the substitute content. For example, the property of the content can include at least one of a content type (e.g., image, video, audio, or multimedia), a playback rate (e.g., a bit rate of video or a bit rate of audio), and a size. For example, the schedule can be determined such that a service quality regarding the substitute content satisfies a preset level.

According to an embodiment, the electronic device 101 can determine a preset schedule corresponding to the selected substitute content. For example, the electronic device 101 can detect the preset schedule corresponding to the selected substitute content and determine the detected schedule as the schedule corresponding to the selected substitute content.

According to an embodiment, the electronic device 101 can determine the schedule corresponding to the selected substitute based on the property of the selected substitute content. For example, the electronic device 101 can check the property of the selected substitute content, detect the schedule from a plurality of schedules based on the property, and determine the detected schedule as the schedule corresponding to the selected substitute content.

For example, the processor 210 can check the type of the selected substitute content, and detect the schedule corresponding to the checked type from the plurality of the schedules. For example, the processor 210 can check the playback rate of the selected substitute content and detect the schedule corresponding to the checked substitute content from the plurality of the schedules. For example, the processor 210 can check the size of the selected substitute content and detect the schedule corresponding to the checked size from the plurality of the schedules.

According to an embodiment, the schedule corresponding to the substitute content can include the proportion of the active interval and the sleep interval per period, which is any one of 8:2, 7:3, 6:4, 5:5, 4:6, 3:7, and 2:8. For example, the active interval can be the activated interval and the sleep interval can be the inactive interval. For example, the schedule can include the active interval and the inactive interval.

According to an embodiment, the processor 210 can transmit the selected substitute content based on the determined schedule, to the external electronic device 102. For example, when the proportion of the active interval and the sleep interval of the determined schedule is 3:7, the processor 210 can transmit the selected substitute content for 3/10 hours of one period and stop the selected substitute content transmission for 7/10 hours of one period.

For example, when the proportion of the active interval and the sleep interval of the determined schedule is 2:8, the processor 210 can transmit the selected substitute content for 2/10 hours of one period and stop the selected substitute content transmission for 8/10 hours of one period.

According to an embodiment, the processor 210 can detect other state of the electronic device after the substitute content transmission. When the other state satisfies a preset condition, the processor 210 can transmit the content to the external electronic device. For example, the preset condition can include returning to the state before the substitute content transmission. For example, the preset condition can include turning on the display 260.

According to an embodiment, when the other state satisfies the preset condition, the processor 210 can transmit information for releasing the schedule corresponding to the substitute content, to the external electronic device 102. For example, the schedule release information can request the schedule release.

The aforementioned components of the electronic device in the present disclosure each can include one or more components, and the name of the corresponding component can differ according to a type of the electronic device. The electronic device (e.g., the electronic device 201) according to various embodiments of the present disclosure can include omit some components, further include other components, or unit some of the components into a single entity, to thus carry out the same functions of the corresponding components.

Figure 3:
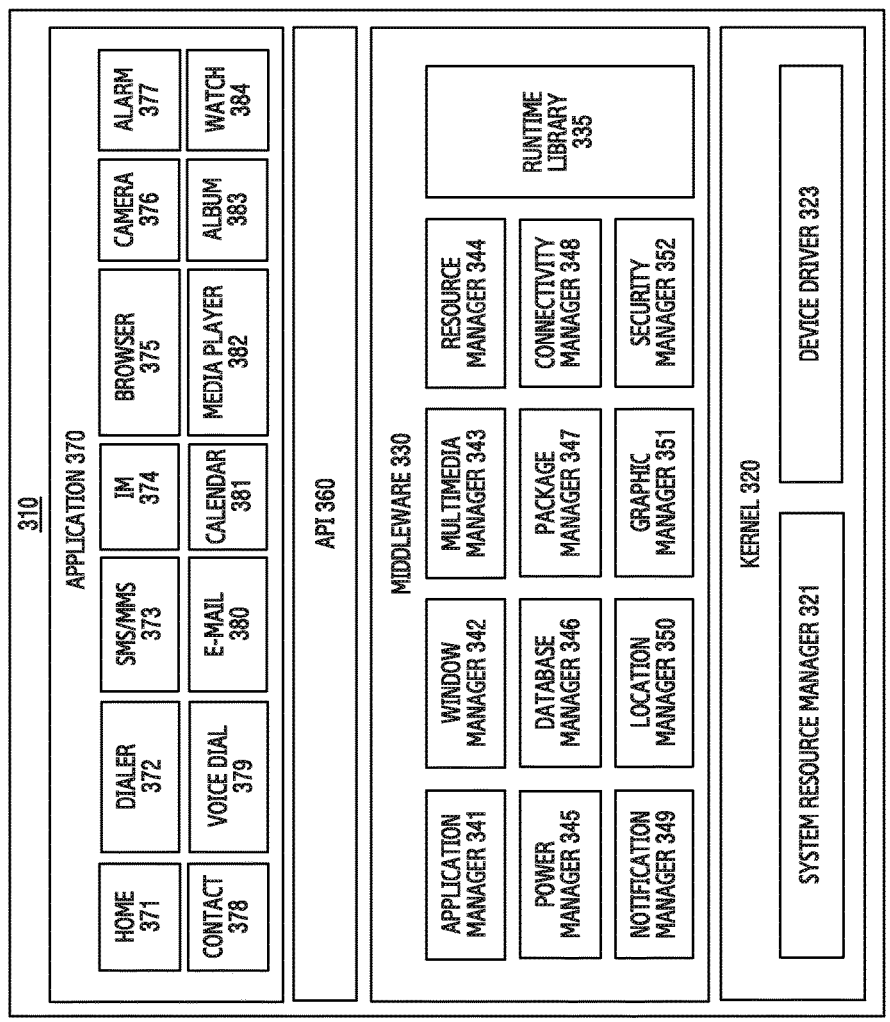
FIG. 3 illustrates a block diagram of a program module according to various embodiments of the present disclosure.

FIG. 3 illustrates a block diagram of a program module 310 according to various embodiments of the present disclosure.

According to an embodiment, the program module 310 (for example, the programs 140) may include an Operating System (OS) for controlling resources related to the electronic device (for example, the electronic device 100) and/or various applications (for example, the application programs 147) executed in the operating system. The operating system may be, for example, Android®, iOS®, Windows®, Symbian®, Tizen®, Bada®, or the like.

The programming module 310 may include a kernel 320, middleware 330, an API 360, and/or applications 370. At least some of the program module 310 may be preloaded in the electronic device or downloaded from the server.

The kernel 320 (for example, the kernel 141 of FIG. 1) may include, for example, a system resource manager 331 or a device driver 333. The system resource manager 331 may control, allocate, or collect the system resources. According to an embodiment, the system resource manager 331 may include a process management unit, a memory management unit, or a file system management unit. The device driver 333 may include, for example, a display driver, a camera driver, a Bluetooth driver, a shared-memory driver, a USB driver, a keypad driver, a WiFi driver, an audio driver, or an inter-process communication (IPC) driver.

The middleware 330 may provide a function required by the applications 370 in common or provide various functions to the applications 370 through the API 360 so that the applications 370 can efficiently use limited system resources within the electronic device. According to an embodiment, the middleware 330 (for example, the middleware 143) may include, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a compiler uses to add new functions through a programming language while the application 370 is executed. The runtime library 335 may perform input/output management, memory management, or a function for an arithmetic function.

The application manager 341 may manage, for example, a life cycle of at least one of the applications 370. The window manager 342 may manage graphical user interface (GUI) resources used by a screen. The multimedia manager 343 may grasp formats required for the reproduction of various media files, and may perform an encoding or decoding of the media file by using a codec suitable for the corresponding format. The resource manager 344 may manage resources such as a source code, a memory, and a storage space of at least one of the applications 370.

The power manager 345 may operate together with a basic input/output System (BIOS) to manage a battery or power and may provide power information required for the operation of the electronic device. The database manager 346 may generate, search for, or change a database to be used by at least one of the applications 370. The package manager 347 may manage the installation or the updating of applications distributed in the form of package file.

The connectivity manager 348 may manage wireless connection of, for example, Wi-Fi or Bluetooth. The notification manager 349 can display or notify of an event such as an arrival message, promise, proximity notification, and the like in such a way that does not disturb a user. The location manager 350 may manage location information of the electronic device. The graphic manager 351 may manage graphic effects to be provided to a user and user interfaces related to the graphic effects. The security manager 352 may provide all security functions required for system security or user authentication. According to an embodiment, when the electronic device (for example, electronic device 100) has a call function, the middleware 330 may further include a telephony manager for managing a voice call function or a video call function of the electronic device.

The middleware 330 may include a middleware module for forming a combination of various functions of the aforementioned components. The middleware 330 may provide modules specialized according to types of operating systems in order to provide differentiated functions. Further, the middleware 330 may dynamically remove some of the existing components or add new components.

The API 360 (for example, the API 145) is, for example, a set of API programming functions, and a different configuration thereof may be provided according to an operating system. For example, Android or iOS may provide one API set per platform, and Tizen may provide two or more API sets per platform.

The applications 370 (for example, the application programs 147) may include, for example, one or more applications which can provide functions such as home 371, dialer 372, SMS/MMS 373, instant message (IM) 374, browser 375, camera 376, alarm 377, contacts 378, voice dialer 379, email 380, calendar 381, media player 382, album 383, clock 384, health care (for example, measure exercise quantity or blood sugar), or environment information (for example, atmospheric pressure, humidity, or temperature information).

According to an embodiment, the applications 370 may include an application (hereinafter, referred to as an "information exchange application" for convenience of the description) supporting information exchange between the electronic device (for example, the electronic device 100) and an external electronic device. The information exchange application may include, for example, a notification relay application for transferring predetermined information to an external electronic device or a device management application for managing an external electronic device.

For example, the notification relay application may include a function of transferring, to the external electronic device, notification information generated from other applications of the electronic device 100 (for example, an SMS/MMS application, an e-mail application, a health management application, or an environmental information application). Further, the notification relay application may receive notification information from, for example, a control device and provide the received notification information to the user. The device management application may manage (for example, install, delete, or update), for example, a function for at least a part of the external electronic device communicating with the electronic device (for example, turning on/off the external electronic device itself (or some elements thereof) or adjusting brightness (or resolution) of a display), applications executed in the external electronic device, or services provided from the external electronic device (for example, a telephone call service or a message service).

According to an embodiment, the applications 370 may include an application (for example, health management application) designated according to attributes of the external electronic device (for example, attributes of the electronic device such as the type of electronic device which corresponds to a mobile medical device). According to an embodiment, the applications 370 may include an application received from the external electronic devices (for example, the server or the electronic device). According to an embodiment, the applications 370 may include a preloaded application or a third party application which can be downloaded from the server. The names of the components of the program module 310 according to the embodiment illustrated in FIG. 3 may vary according to the type of operating system.

According to various embodiments, at least some of the programming module 310 may be implemented by software, firmware, hardware, or a combination of two or more thereof. At least some of the programming module 310 may be implemented (for example, executed) by, for example, the processor (for example, the application program). At least some of the programming module 310 may include, for example, a module, program, routine, sets of instructions, or process for performing one or more functions.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an application-specific integrated circuit (ASIC) chip, a field-programmable gate arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may be, for example, the memory 130.

The computer readable recoding medium may include a hard disk, a floppy disk, magnetic media (e.g., a magnetic tape), optical media (e.g., a compact disc read only memory (CD-ROM) and a digital versatile disc (DVD)), magneto-optical media (e.g., a floptical disk), a hardware device (e.g., a read only memory (ROM), a random access memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

Various embodiments disclosed herein are provided merely to easily describe technical details of the present disclosure and to help the understanding of the present disclosure, and are not intended to limit the scope of the present disclosure. Accordingly, the scope of the present disclosure should be construed as including all modifications or various other embodiments based on the technical idea of the present disclosure.

Figure 4:
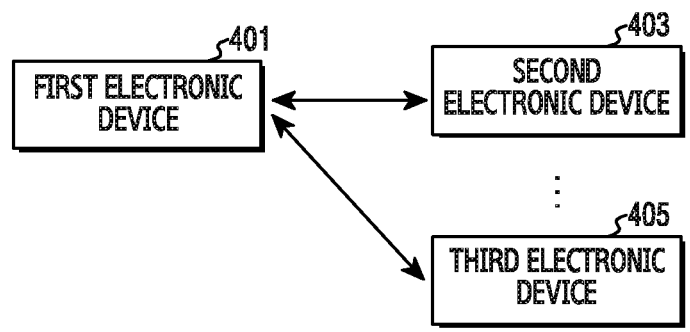
FIG. 4 illustrates a block diagram of a communication system according to various embodiments of the present disclosure.

FIG. 4 illustrates a block diagram of a communication system according to various embodiments of the present disclosure. For example, the communication system can include a first electronic device 401, a second electronic device 403, and a third electronic device 405. For example, the first, second, and third electronic devices 401, 403, and 405 can include some or all of the components of the electronic device 101 of FIG. 1.

Referring to FIG. 4, the first electronic device 401 can connect to the second electronic device 403 using short-range communication. For example, the first electronic device 401 can connect to a plurality of electronic devices (e.g., the second electronic device 403 and the third electronic device 405) using the short-range communication. For example, the short-range communication can include WiFi, BLE, Bluetooth, NFC, and so forth.

According to an embodiment, the first electronic device 401 can connect to the second electronic device 403 using the WiFi Direct communication (or WiFi Peer-to-Peer (P2P)). For example, the WiFi Direct communication is based on WiFi and can enable devices (e.g., the first electronic device 401 and the second electronic device 403) to directly connect with each other without infrastructure equipment such as an Access Point (AP) or a router. For example, the WiFi Direct can be deployed in various devices including a smart phone, a TV, a notebook, a printer, and a camera, and use contents and services through direct communication between devices.

According to an embodiment, when the electronic devices are connected using the WiFi Direct, a group (e.g., a P2P group) including the electronic devices can be formed. For example, when the electronic devices are connected one to one, one electronic device (e.g., the electronic device 401) can serve as a group owner, and the other electronic device (e.g., the electronic device 403) can serve as a group client. For example, the group owner can act as an AP in a WLAN network. For example, the group client can act as a station in the WLAN network.

According to an embodiment, one of the electronic devices in the group can be determined as the group owner using a group owner negotiation protocol during the WiFi Direction connection. For example, the group can be formed with 1:1 and 1:N connections using the WiFi Direct. The number of group clients served by the group owner can be determined according to a capability of the group owner.

According to an embodiment, when a plurality of electronic devices (e.g., the first and second electronic devices 401 and 403) forms a P2P group and the first electronic device 401 serves as the group owner, the second electronic device 403 can become the group client. When a plurality of electronic devices (e.g., the first, second, and third electronic devices 401, 403, and 405) forms a P2P group and the first electronic device 401 serves as the group owner, the other electronic devices (e.g., the second and the third electronic devices 403 and 405) can become the group clients.

Figure 5:
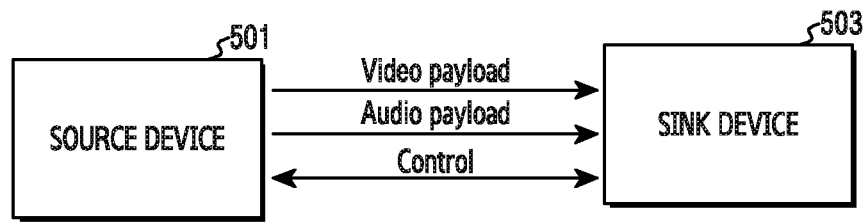
FIG. 5 illustrates a diagram of data transmission flows in a communication system according to various embodiments of the present disclosure.

FIG. 5 illustrates data transmission flows in a communication system according to various embodiments. For example, a first electronic device can be the electronic device 101 of FIG. 1 or the first electronic device 401 of FIG. 4. For example, a second electronic device can be the electronic device 102 of FIG. 1 or the second electronic device 403 of FIG. 4.

According to an embodiment, the first electronic device 401 can connect with the second electronic device 403 using the WiFi Direct communication. For example, the first electronic device 401 and the second electronic device 403 can provide a screen mirroring service using the WiFi Direct communication. For example, the screen mirroring service can display data (e.g., mirroring data or streaming data) which is displayed on a screen (e.g., a display) of one of the electronic devices of the P2P group, on a display of the other electronic device at the same time or identically.

According to an embodiment, among the electronic devices of the P2P group, the electronic device which provides the mirroring data can be referred to as a source device, and the electronic device which receives and outputs the mirroring data can be referred to as a sink device. For example, the mirroring data can include a video payload and an audio payload. Electronic devices can transmit/receive control signals for controlling the screen mirroring service.

According to an embodiment, when the first electronic device 401 transmits mirroring data, the first electronic device 401 can become the source device and the second electronic device 403 can become the sink device. When the second electronic device 403 transmits mirroring data, the second electronic device 403 can become the source device and the first electronic device 401 can become the sink device.

According to an embodiment, the first electronic device 401 can serve as the group owner and the source device. In this case, the second electronic device 403 can serve as the group client and the sink device. The first electronic device 401 can serve as the group owner and the sink device. In this case, the second electronic device 403 can serve as the group client and the source device. The first electronic device 401 can serve as the group client and the source device. In this case, the second electronic device 403 can serve as the group owner and the sink device. The first electronic device 401 can serve as the group client and the sink device. In this case, the second electronic device 403 can serve as the group owner and the source device.

Figure 6:
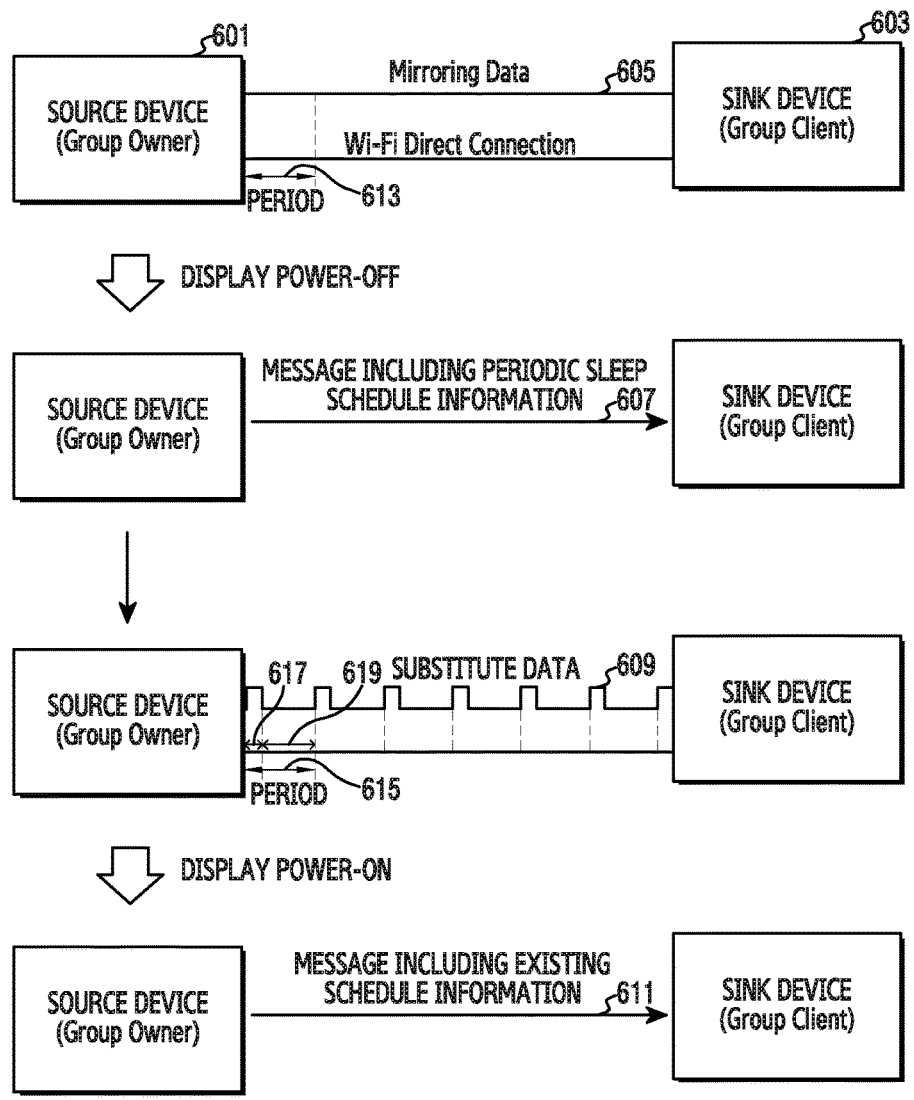
FIG. 6 illustrates another diagram of data transmission flows in a communication system according to one embodiment of the present disclosure.

FIG. 6 illustrates data transmission flows in a communication system according to one embodiment. For example, the communication system can include a source device 601 and a sink device 603. For example, the source device 601 can be the electronic device 101 of FIG. 1 or the first electronic device 401 of FIG. 4. For example, the source device 601 can be a group owner. For example, the sink device 603 can be the external electronic device 102 of FIG. 1 or the second electronic device 403 of FIG. 4. For example, the sink device 603 can be a group client.

For example, the source device 601 can be an electronic device including a display (e.g., the display 260) and a battery (e.g., the battery 296). For example, the source device 601 can be a smartphone.

Referring to FIG. 6, the source device 601 can transmit mirroring data 605 to the sink device 603. According to an embodiment, the sink device 603 can receive and output the mirroring data. For example, the mirroring data can indicate data which is output from the source device 601. For example, the mirroring data can include video data, audio data, or multimedia data (e.g., a combination of video data and audio data).

According to an embodiment, the source device 601 can transmit mirroring data according to schedule information corresponding to the mirroring data. For example, the schedule information corresponding to the mirroring data can set the proportion of the active interval and the sleep interval per period to 1:0. For example, one period 613 can include the active interval and may not include the sleep interval.

According to an embodiment, when the display 260 of the source device 601 is turned off, the source device 601 can set periodic sleep schedule information based on substitute data. For example, the periodic sleep schedule information can include information about the sleep interval and the active interval to periodically deactivate or activate a communication interface (e.g., the communication module 220). For example, the periodic sleep schedule information can include the proportion of the active interval and the sleep interval of the period.

According to an embodiment, the source device 601 can select substitute data for the mirroring data. For example, the substitute data can be preset. For example, the substitute data can be selected by the user from at least one data stored in a memory (e.g., the memory 230).

According to an embodiment, the source device 601 can determine the periodic sleep schedule information corresponding to the selected substitute data. For example, the periodic sleep schedule information can be set to satisfy quality of service (QoS) of the substitute data.

According to an embodiment, the source device 601 can determine the periodic sleep schedule information corresponding to the selected substitute data. For example, the source device 601 can detect preset periodic sleep schedule information corresponding to the selected substitute data from the memory 230, and determine the detected periodic sleep schedule information as the periodic sleep schedule information corresponding to the selected substitute data.

According to an embodiment, the source device 601 can set the periodic sleep schedule information corresponding to the selected substitute data based on the property of the selected substitute data. For example, the source device 501 can check the property of the selected substitute data, detect the periodic sleep schedule information from multiple periodic sleep schedule information stored in the memory 230 based on the property, and determine the detected periodic sleep schedule information as the periodic sleep schedule information corresponding to the selected substitute data. For example, the property can include the type, the playback rate, and the size of the substitute data.

For example, the source device 601 can check the type of the selected substitute data and detect the periodic sleep schedule information corresponding to the type from the multiple periodic sleep schedule information. For example, the source device 601 can check the playback rate of the selected substitute data and detect the periodic sleep schedule information corresponding to the playback rate from the multiple periodic sleep schedule information. For example, the source device 601 can check the size of the selected substitute data and detect the periodic sleep schedule information corresponding to the size from the multiple periodic sleep schedule information.

According to an embodiment, the source device 601 can send a message 607 including the periodic sleep schedule information to the sink device 603. For example, the message can include a beacon message, a probe response message, or a P2P action frame.

According to an embodiment, the sink device 603 can synchronize with the source device 601 according to the periodic sleep schedule information. The sink device 603 can receive the message including the periodic sleep schedule information and synchronize a data communication period with the source device 601 according to the periodic sleep schedule information.

According to an embodiment, the source device 601 can transmit substitute data 609 to the sink device 603 according to the periodic sleep schedule information. For example, the source device 601 can transmit the substitute data over an active interval 617 of a period 615 and stop transmitting the substitute data over a sleep interval 619. Next, the source device 601 can transmit the substitute data over an active interval of a next period.

According to an embodiment, the sink device 603 can receive and output the substitute data according to the periodic sleep schedule information. For example, the sink device 603 can receive the substitute data over an active interval 617 of a period 615 and stop receiving the substitute data over a sleep interval 619.

According to an embodiment, when the display 260 is turned on, the source device 601 can stop the substitute data transmission and set existing schedule information (e.g., schedule information corresponding to the mirroring data).

According to an embodiment, the source device 601 can send a message 611 including the existing schedule information to the sink device 603. For example, the message can include a beacon message, a probe response message, or a separate P2P action frame. The source device 601 can change a data communication period with the sink device 603 based on the existing schedule information.

According to an embodiment, the sink device 603 can receive a message 611 including the existing schedule information and synchronize the data communication period with the source device 601 according to the existing schedule information.

According to an embodiment, the source device 601 can transmit mirroring data to the sink device 603 according to the existing schedule information. For example, when the existing schedule information does not include sleep interval information or the proportion of the sleep interval in the existing schedule information is zero, the source device 601 can transmit the mirroring data without stopping the transmission.

Figure 7:
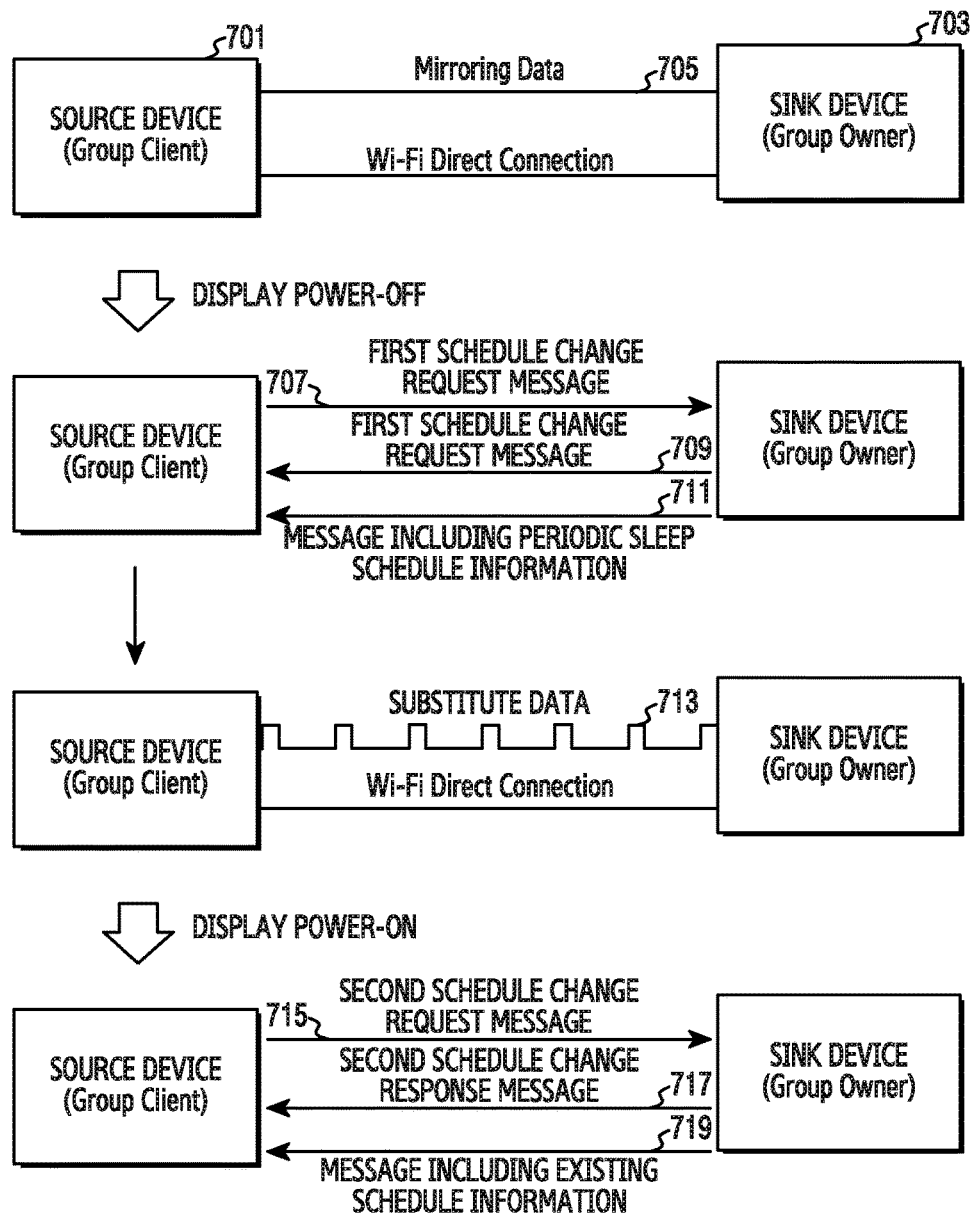
FIG. 7 illustrates yet another diagram of data transmission flows in a communication system according to an embodiment of the present disclosure.

FIG. 7 illustrates another data transmission flows in a communication system according to an embodiment of the present disclosure. For example, the communication system can include a source device 701 and a sink device 703. For example, the source device 701 can be the electronic device 101 of FIG. 1 or the first electronic device 401 of FIG. 4. For example, the source device 701 can be a group client. For example, the sink device 703 can be the external electronic device 102 of FIG. 1 or the second electronic device 403 of FIG. 4. For example, the sink device 703 can be a group owner.

For example, the source device 701 can be an electronic device including a display (e.g., the display 260) and a battery (e.g., the battery 296). For example, the source device 701 can be a smartphone.

Referring to FIG. 7, the source device 701 can transmit mirroring data 705 to the sink device 703. According to an embodiment, the source device 701 can transmit mirroring data 705 according to schedule information corresponding to the mirroring data 705. For example, the schedule information corresponding to the mirroring data 705 may include an active interval and not include a sleep interval per period. For example, when the schedule information includes the proportion of the active interval and the sleep interval per period, the proportion of the active interval and the sleep interval per period of the schedule information corresponding to the mirroring data 705 can be 1:0.

According to an embodiment, the sink device 703 can receive from the source device 701 and output the mirroring data. When the display 260 of the source device 701 is turned off, the source device 701 can determine periodic sleep schedule information based on substitute data. For example, the source device 701 can select the substitute data for the mirroring data and determine the periodic sleep schedule information corresponding to the selected substitute data.

According to an embodiment, the source device 701 can generate a first schedule change request message 707 based on the periodic sleep schedule information and transmit the message to the sink device 703. For example, the first schedule change request message 707 can request the schedule change of the sink device 703. The first schedule change request message 707 can be a P2P action frame.

According to an embodiment, the first schedule change request message 707 can include the periodic sleep schedule information. The first schedule change request message 707 can include the periodic sleep schedule information and state information of the source device 701. For example, the state information of the source device 701 can include information indicating the power-off of the display 260 of the source device 701.

According to an embodiment, in response to the first schedule change request message 707, the sink device 703 can generate and transmit a first schedule change response message 709 to the source device 701. The first schedule change response message 709 can include a response (e.g., approval or rejection for the schedule change) for the first schedule change request message 707.

According to an embodiment, the sink device 703 can determine whether the substitute data can be scheduled based on the periodic sleep schedule information of the first schedule change request message 707. When the scheduling is possible, the sink device 703 can generate and transmit the first schedule change response message 709 including the schedule change approval. When the scheduling is infeasible, the sink device 703 can generate and transmit the first schedule change response message 709 including the schedule change rejection.

According to an embodiment, based on the state information of the source device 701 in the first schedule change request message 707, the sink device 703 can output the state of the source device 701. For example, the sink device 703 can display information or output a voice indicating the power-off of the display 260 of the source device 701, or output a combination of them.

According to an embodiment, the sink device 703 can generate and send a message 711 including the periodic sleep schedule information to the source device 701. For example, the message 711 including the periodic sleep schedule information can be a beacon message, a probe response message, or a separate P2P action frame.

According to an embodiment, when the scheduling changes, the sink device 703 can generate and send the message 711 including the periodic sleep schedule information. The sink device 703 can change the data communication period with the source device 701 according to the periodic sleep schedule information.

According to an embodiment, the source device 701 can synchronize with the sink device 703 according to the periodic sleep schedule information. For example, the source device 701 can receive the message 711 including the periodic sleep schedule information and synchronize the data communication period with the sink device 703 according to the periodic sleep schedule information.

According to an embodiment, the source device 701 can transmit substitute data 713 to the sink device 703 according to the periodic sleep schedule information. The sink device 703 can receive and output the substitute data 713 according to the periodic sleep schedule information.

According to an embodiment, when the display 260 is turned on, the source device 701 can stop transmitting the substitute data 713 and determine existing schedule information (e.g., schedule information corresponding to the mirroring data).

According to an embodiment, the source device 701 can generate and send a second schedule change request message 715 to the sink device 703 based on the existing schedule information. For example, the second schedule change request message 715 can request the schedule change of the sink device 703. For example, the second schedule change request message 715 can include the existing schedule information.

According to an embodiment, in response to the second schedule change request message 715, the sink device 703 can generate and send a second schedule change response message 717 to the source device 701. For example, the second schedule change response message 717 can include a response (e.g., approval or rejection for the schedule change) for the second schedule change request message 715.

According to an embodiment, the sink device 703 can determine whether the mirroring data can be scheduled based on the existing sleep schedule information of the second schedule change request message 715. When the scheduling is possible, the sink device 703 can generate and send the second schedule change response message 717 including the schedule change approval. When the scheduling is infeasible, the sink device 703 can generate and send the second schedule change response message 717 including the schedule change rejection.

According to an embodiment, the sink device 703 can generate and transmit a message 719 including the existing schedule information to the source device 701. For example, when the scheduling changes, the sink device 703 can generate and transmit the message 719 including the existing schedule information. The sink device 703 can change the data communication period according to the existing schedule information.

According to an embodiment, the source device 701 can synchronize with the sink device 703 according to the existing schedule information. For example, the source device 701 can receive the message 719 including the existing schedule information and synchronize the data communication period with the sink device 703 according to the existing schedule information.

According to an embodiment, the source device 701 can transmit mirroring data to the sink device 703. For example, when the existing schedule information does not include the sleep interval information or the proportion of the sleep interval in the existing schedule information is zero, the source device 701 can transmit the mirroring data without stopping the transmission.

Figure 8:
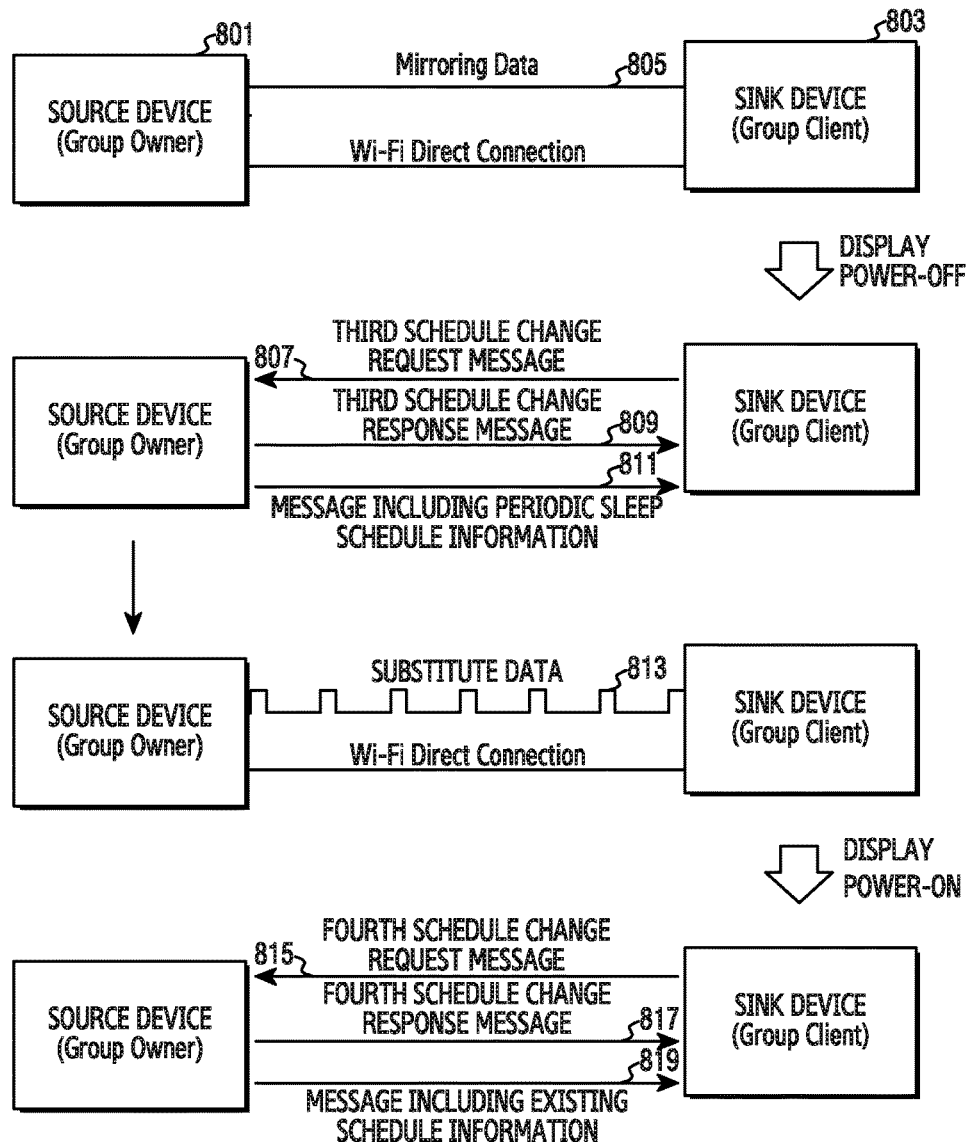
FIG. 8 illustrates yet another diagram of data transmission flows in a communication system according to an embodiment of the present disclosure.

FIG. 8 illustrates yet another data transmission flows in a communication system according to an embodiment of the present disclosure. For example, the communication system can include a source device 801 and a sink device 803. For example, the source device 801 can be the electronic device 101 of FIG. 1 or the first electronic device 401 of FIG. 4. For example, the source device 801 can be a group owner. For example, the sink device 803 can be the external electronic device 102 of FIG. 1 or the second electronic device 403 of FIG. 4. For example, the sink device 803 can be a group client.

For example, the source device 801 and the sink device 803 can be electronic devices including a display (e.g., the display 260) and a battery (e.g., the battery 296). For example, the source device 801 can be a smartphone, and the sink device 803 can be a notebook including the greater display 260 than the smartphone.

Referring to FIG. 8, the source device 801 can transmit mirroring data 805 to the sink device 803. According to an embodiment, the source device 801 can transmit mirroring data 805 according to schedule information corresponding to the mirroring data 805.

According to an embodiment, the sink device 803 can receive and output the mirroring data 805. When the display 260 of the sink device 803 is turned off, the sink device 803 can determine periodic sleep schedule information based on substitute data. For example, the periodic sleep schedule information can include information about the sleep interval and the active interval to periodically deactivate or activate a communication interface (e.g., the communication module 220).

According to an embodiment, the sink device 803 can select substitute data for the mirroring data. For example, the sink device 803 can select preset substitute data from a memory (e.g., the memory 230). For example, the sink device 803 can determine data selected by the user from at least one data stored in the memory (e.g., the memory 230), as the substitute data.

According to an embodiment, the sink device 803 can determine periodic sleep schedule information corresponding to the selected substitute data. For example, the sink device 803 can determine preset periodic sleep schedule information of the selected substitute data from the memory 230. For example, the sink device 803 can select one of multiple periodic sleep schedule information stored in the memory 230 based on a property of the selected substitute data, and determine the selected periodic sleep schedule information as the periodic sleep schedule information corresponding to the substitute data.

According to an embodiment, the sink device 803 can generate a third schedule change request message 807 based on the periodic sleep schedule information and send the message to the source device 801. For example, the third schedule change request message 807 can request the schedule change of the source device 801. For example, the third schedule change request message 807 can be a P2P action frame.

According to an embodiment, the third schedule change request message 807 can include the periodic sleep schedule information. The third schedule change request message 807 can include the periodic sleep schedule information and state information of the sink device 803. For example, the state information of the sink device 803 can include information indicating the power-off of the display 260 of the sink device 803. The third schedule change request message 807 can include at least one of the periodic sleep schedule information, the state information of the sink device 803, and the substitute data.

According to an embodiment, in response to the third schedule change request message 807, the source device 801 can generate and send a third schedule change response message 809 to the sink device 803. For example, the third schedule change response message 809 can include a response (e.g., approval or rejection for the schedule change) for the third schedule change request message 809.

According to an embodiment, the source device 801 can determine whether the substitute data can be scheduled based on the periodic sleep schedule information of the third schedule change request message 807. When the scheduling is possible, the source device 801 can generate and transmit the third schedule change response message 809 including the schedule change approval. When the scheduling is infeasible, the source device 801 can generate and transmit the third schedule change response message 809 including the schedule change rejection.

According to an embodiment, based on the state information of the sink device 803 of the third schedule change request message 807, the source device 801 can output the state of the sink device 803. For example, the source device 801 can display information or output a voice indicating the power-off of the display 260 of the sink device 803, or output a combination of them.

According to an embodiment, the source device 801 can generate and send a message 811 including the periodic sleep schedule information to the sink device 803. When the scheduling changes, the source device 801 can generate and send the message 811 including the periodic sleep schedule information. The source device 801 can change the data communication period with the sink device 803 according to the periodic sleep schedule information.

According to an embodiment, the sink device 803 can synchronize with the source device 801 according to the periodic sleep schedule information. For example, the sink device 803 can receive the message 811 including the periodic sleep schedule information and synchronize the data communication period with the source device 801 according to the periodic sleep schedule information.

According to an embodiment, the source device 801 can transmit substitute data 813 to the sink device 803 according to the periodic sleep schedule information. For example, the substitute data can be contained in the third schedule change request message 807. The sink device 803 can receive and output the substitute data 813 according to the periodic sleep schedule information.

According to an embodiment, when the display 260 is turned on, the sink device 803 can generate and send a fourth schedule change request message 815 to the source device 801 based on existing schedule information (e.g., schedule information corresponding to the mirroring data). The fourth schedule change request message 815 can request the schedule change of the source device 801. The fourth schedule change request message 815 can be a P2P action frame. The fourth schedule change request message 815 can include the existing schedule information.

According to an embodiment, in response to the fourth schedule change request message 815, the source device 801 can generate and send a fourth schedule change response message 817 to the sink device 803. For example, the fourth schedule change response message 817 can include a response (e.g., approval or rejection for the schedule change) for the fourth schedule change request message 815.

According to an embodiment, the source device 801 can generate and send a message 819 including the existing schedule information to the sink device 803. When the scheduling changes, the source device 801 can generate and send the message 819 including the existing schedule information. The source device 801 can change the data communication period with the sink device 803 according to the existing schedule information.

According to an embodiment, the sink device 803 can synchronize with the source device 801 according to the existing schedule information. For example, the sink device 803 can receive the message 819 including the existing schedule information and synchronize the data communication period with the source device 801 according to the existing schedule information.

According to an embodiment, the source device 801 can transmit mirroring data to the sink device 803. For example, when the existing schedule information does not include the sleep interval information or the proportion of the sleep interval in the existing schedule information is zero, the source device 801 can transmit the mirroring data without stopping the transmission.

Figure 9:
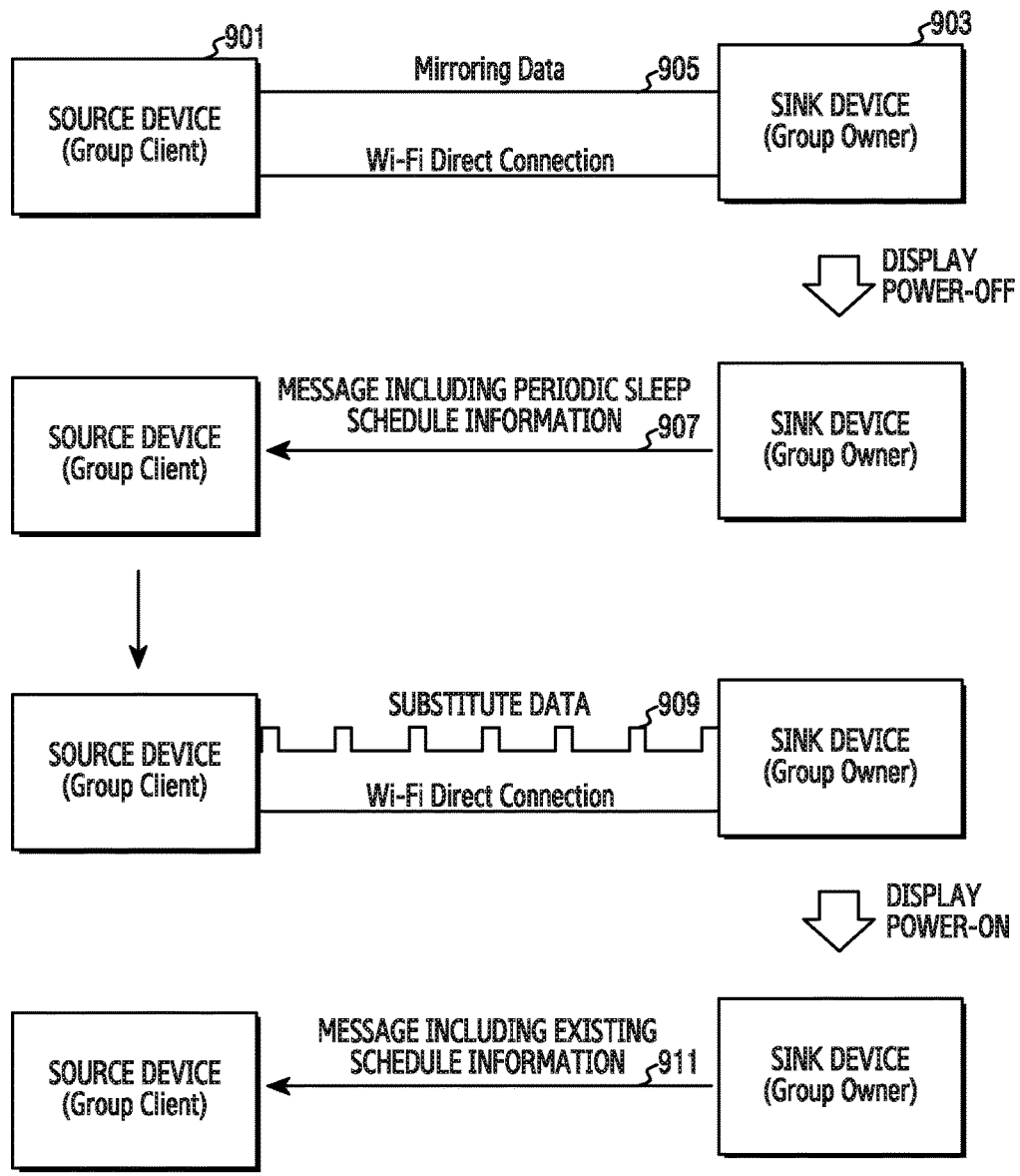
FIG. 9 illustrates yet another diagram of data transmission flows in a communication system according to an embodiment of the present disclosure.

FIG. 9 illustrates yet another data transmission flows in a communication system according to an embodiment of the present disclosure. For example, the communication system can include a source device 901 and a sink device 903. For example, the source device 901 can be the electronic device 101 of FIG. 1 or the first electronic device 401 of FIG. 4. For example, the source device 901 can be a group client. For example, the sink device 903 can be the external electronic device 102 of FIG. 1 or the second electronic device 403 of FIG. 4. For example, the sink device 903 can be a group owner.

For example, the source device 901 and the sink device 903 can be electronic devices including a display (e.g., the display 260) and a battery (e.g., the battery 296). For example, the source device 901 can be a smartphone, and the sink device 803 can be a notebook including the greater display 260 than the smartphone.

Referring to FIG. 9, the source device 901 can transmit mirroring data 905 to the sink device 903. According to an embodiment, the source device 901 can transmit mirroring data 905 according to schedule information corresponding to the mirroring data 905.

According to an embodiment, the sink device 903 can receive and output the mirroring data 905. When the display 260 of the sink device 903 is turned off, the sink device 903 can set periodic sleep schedule information based on substitute data. For example, the sink device 903 can select substitute data for the mirroring data and determine the periodic sleep schedule information corresponding to the selected substitute data.

According to an embodiment, the sink device 903 can transmit a message 907 including the periodic sleep schedule information to the source device 901. The sink device 903 can change the data communication period with the source device 901 according to the periodic schedule information.

According to an embodiment, the source device 901 can synchronize with the sink device 903 according to the periodic sleep schedule information. For example, the source device 901 can receive the message 907 including the periodic sleep schedule information and synchronize the data communication period with the sink device 903 according to the periodic sleep schedule information.

According to an embodiment, the source device 901 can transmit substitute data according to the periodic sleep schedule information. The sink device 903 can receive and output the substitute data according to the periodic sleep schedule information.

According to an embodiment, when the display 260 is turned on, the sink device 903 can set existing schedule information (e.g., schedule information corresponding to the mirroring data). The sink device 903 can send a message 911 including the existing schedule information to the source device 901. The sink device 903 can change the data communication period with the source device 901 based on the periodic sleep schedule information.

According to an embodiment, the source device 901 can receive a message 911 including the existing schedule information and synchronize the data communication period with the sink device 903 according to the existing schedule information.

According to an embodiment, the source device 901 can transmit mirroring data to the sink device 903. For example, when the existing schedule information does not include sleep interval information or the proportion of the sleep interval in the existing schedule information is zero, the source device 901 can transmit the mirroring data without stopping the transmission.

Figure 10:
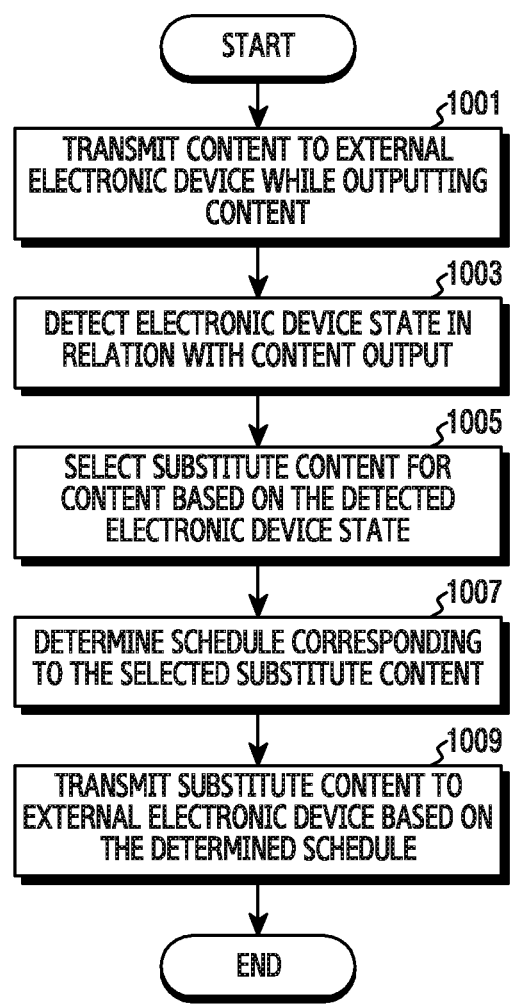
FIG. 10 illustrates a flowchart of data transmission in an electronic device according to various embodiments of the present disclosure.

FIG. 10 illustrates a flowchart of data transmission in an electronic device according to various embodiments of the present disclosure. For example, the electronic device can be the electronic device 101 of FIG. 1 or the first electronic device 401 of FIG. 4. For example, the electronic device 101 can serve as a source device and a group owner or a group client.

Referring to FIG. 10, in operation 1001, the electronic device 101 can output and transmit content to an external electronic device (e.g., the external electronic device 102). For example, the electronic device 101 can provide a screen mirroring service to the external electronic device 102 using the WiFi Direct communication.

According to an embodiment, the electronic device 101 can transmit the content according to a corresponding schedule. For example, the schedule (or schedule information) can be the time information indicating the active interval and the sleep interval of the communication interface (e.g., the communication module 220 or the WIFI module 223 of the communication module 220) based on a preset period. For example, the schedule can be the proportion of the active interval and the sleep interval in the period. For example, the active interval can deliver data (e.g., content) by activating the communication module 220. For example, the sleep interval cannot deliver data by deactivating the communication module 220 so as to minimize the current consumption of the communication module 220.

According to an embodiment, the schedule corresponding to the content can include the proportion 1:0 of the active interval and the sleep interval of the period. For example, the schedule corresponding to the content can include only the active interval.

In operation 1003, the electronic device 101 can detect the electronic device's state in relation with the content output. For example, the state of the electronic device 101 can include an active state, an inactive state, a low-power state, or a power-on state or a power-off state of the display 260. For example, the state of the electronic device 101 can include a function state of the display 260, a content change, and a change of an application or a function (e.g., camera or call) which reproduces the content.

In operation 1005, the electronic device 101 can select substitute content for the content based on the detected state of the electronic device 101. For example, the substitute content can be smaller than the content in size. For example, the substitute content can include an image, an audio, a video, or a combination of them.

According to an embodiment, when the display 260 is turned off, the electronic device 101 can select the substitute content for the content. For example, the substitute content can be preset or pre-selected. For example, the substitute content can be selected by the user from at least one content stored in a memory (e.g., the memory 230).

In operation 1007, the electronic device 101 can determine the schedule corresponding to the selected substitute content. For example, the schedule corresponding to the selected substitute content can be designated or determined based on a property of the substitute content. For example, the property of the content can include at least one of a content type (e.g., image, video, audio, or multimedia), a playback rate (e.g., a bit rate of video or a bit rate of audio), and a size. For example, the schedule can be determined such that a service quality regarding the substitute content satisfies a preset level.

According to an embodiment, the electronic device 101 can determine a preset schedule corresponding to the selected substitute content. For example, the electronic device 101 can detect the preset schedule corresponding to the selected substitute content and determine the detected schedule as the schedule corresponding to the selected substitute content.

According to an embodiment, the electronic device 101 can determine the schedule corresponding to the selected substitute content based on the property of the selected substitute content. For example, the electronic device 101 can check the property of the selected substitute content, detect the schedule from a plurality of schedules based on the property, and determine the detected schedule as the schedule corresponding to the selected substitute content.

For example, the electronic device 101 can check the type of the selected substitute content, and detect the schedule corresponding to the checked type from the plurality of the schedules. For example, the electronic device 101 can check the playback rate of the selected substitute content and detect the schedule corresponding to the playback rate from the plurality of the schedules. For example, the electronic device 101 can check the size of the selected substitute content and detect the schedule corresponding to the size from the plurality of the schedules.

According to an embodiment, the schedule corresponding to the substitute content can include the proportion of the active interval and the sleep interval per period, which is any one of 8:2, 7:3, 6:4, 5:5, 4:6, 3:7, and 2:8. For example, the active interval can be the activated interval and the sleep interval can be the inactive interval. For example, the schedule can include the active interval and the inactive interval.

In operation 1009, the electronic device 101 can transmit the selected substitute content based on the determined schedule, to the external electronic device 102. For example, when the proportion of the active interval and the sleep interval of the determined schedule is 3:7, the electronic device 101 can transmit the selected substitute content for 3/10 hours of one period and stop the selected substitute content transmission for 7/10 hours of one period.

For example, when the proportion of the active interval and the sleep interval of the determined schedule is 2:8, the electronic device 101 can transmit the selected substitute content for 2/10 hours of one period and stop the selected substitute content transmission for 8/10 hours of one period.

According to an embodiment, the electronic device 101 can detect other state of the electronic device after the substitute content transmission. When the other state satisfies a preset condition, the electronic device 101 can transmit the content to the external electronic device 102. For example, the preset condition can include returning to the state before the substitute content transmission. For example, the preset condition can include turning on the display 260.

According to an embodiment, when the other state satisfies the preset condition, the electronic device 101 can transmit information for releasing the schedule corresponding to the substitute content, to the external electronic device 102. For example, the schedule release information can request the schedule release.

Figure 11:
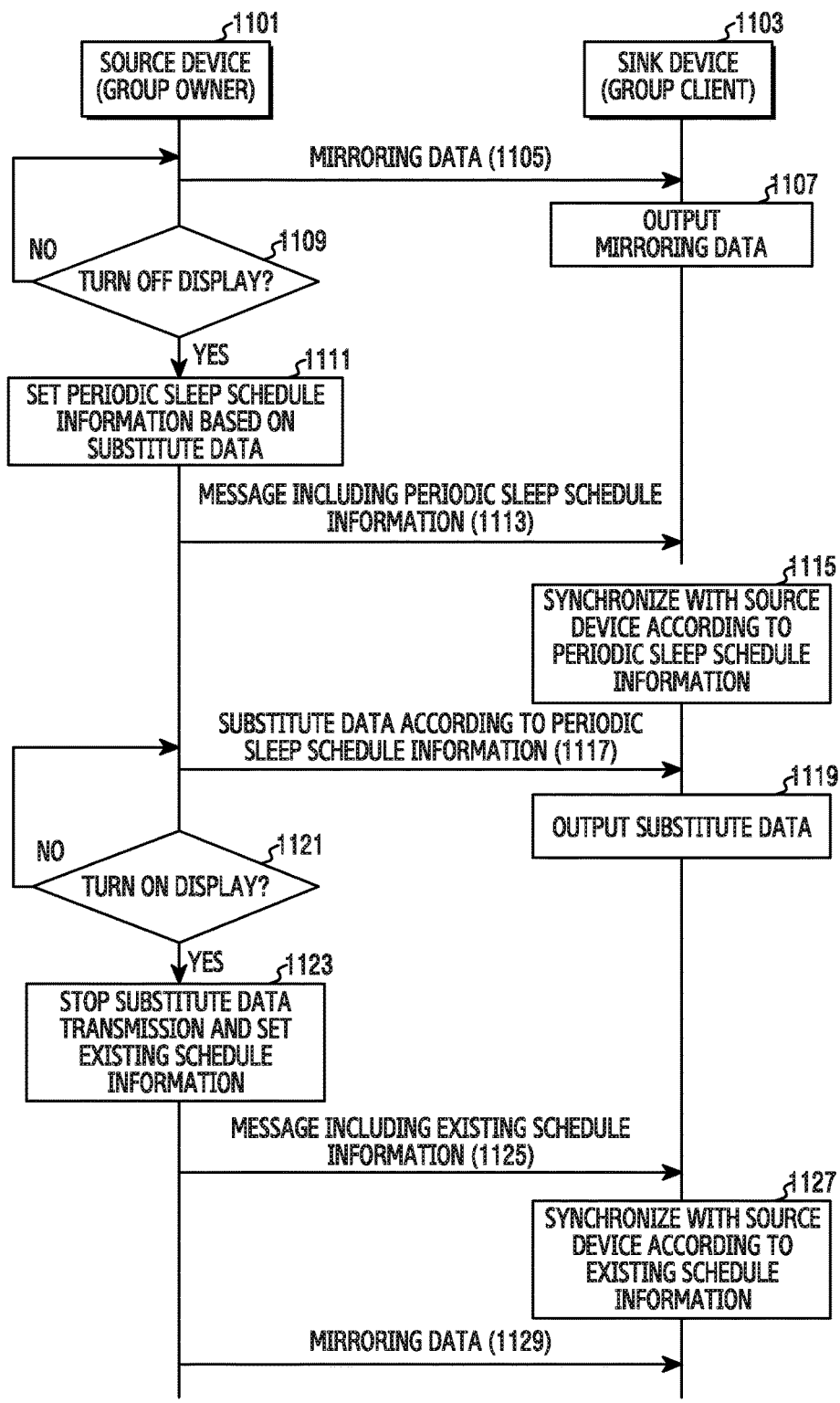
FIG. 11 illustrates a flowchart of data transmission in a communication system according to one embodiment of the present disclosure.

FIG. 11 illustrates a flowchart of data transmission in a communication system according to one embodiment of the present disclosure. For example, the communication system can include a source device 1101 and a sink device 1103. For example, the source device 1101 can be the electronic device 101 of FIG. 1 or the first electronic device 401 of FIG. 4. For example, the source device 1101 can be a group owner. For example, the sink device 1103 can be the external electronic device 102 of FIG. 1 or the second electronic device 403 of FIG. 4. For example, the sink device 1103 can be a group client.

Referring to FIG. 11, in operation 1105, the source device 1101 can transmit mirroring data 1105 to the sink device 1103. For example, the mirroring data can indicate data which is output from the source device 1101. For example, the mirroring data can include video data, audio data, or multimedia data (e.g., a combination of video data and audio data).

According to an embodiment, the source device 1101 can transmit the mirroring data according to schedule information corresponding to the mirroring data. For example, the schedule information corresponding to the mirroring data can set the proportion of the active interval and the sleep interval per period to 1:0.

In operation 1107, the sink device 1103 can receive and output the mirroring data. For example, when the mirroring data is video data, the sink device 1103 can display the video data through a display (e.g., the display 260). For example, when the mirroring data is multimedia data, the sink device 1103 can display video data through the display 260 and concurrently output audio data through a speaker (e.g., the speaker 282).

In operation 1109, the source device 1101 can determine whether the source device's display (e.g., the display 260) is turned off. When the display 260 is turned off, the source device 1101 goes to operation 1111. Otherwise, the source device 1101 can repeat operation 1105.

In operation 1111, the source device 1101 can set periodic sleep schedule information based on substitute data. For example, the periodic sleep schedule information can include information about the sleep interval to periodically deactivate a communication interface (e.g., the communication module 220). For example, the periodic sleep schedule information can include the proportion of the active interval and the sleep interval of the period.

According to an embodiment, the source device 1101 can select substitute data for the mirroring data. For example, the substitute data can be preset or pre-selected. For example, the substitute data can be selected by the user from at least one data stored in a memory (e.g., the memory 230).

According to an embodiment, the source device 1101 can determine the periodic sleep schedule information corresponding to the selected substitute data. For example, the periodic sleep schedule information can be set to satisfy the QoS of the substitute data.

According to an embodiment, the source device 1101 can determine the periodic sleep schedule information corresponding to the selected substitute data. For example, the source device 1101 can detect preset periodic sleep schedule information corresponding to the selected substitute data from the memory 230, and determine the detected periodic sleep schedule information as the periodic sleep schedule information corresponding to the selected substitute data.

According to an embodiment, the source device 1101 can set the periodic sleep schedule information corresponding to the selected substitute data based on the property of the selected substitute data. For example, the source device 1101 can check the property of the selected substitute data, detect the periodic sleep schedule information from multiple periodic sleep schedule information stored in the memory 230 based on the property, and determine the detected periodic sleep schedule information as the periodic sleep schedule information corresponding to the selected substitute data.

For example, the source device 1101 can check the type of the selected substitute data and detect the periodic sleep schedule information corresponding to the type from the multiple periodic sleep schedule information. For example, the source device 1101 can check the playback rate of the selected substitute data and detect the periodic sleep schedule information corresponding to the playback rate from the multiple periodic sleep schedule information. For example, the source device 1101 can check the size of the selected substitute data and detect the periodic sleep schedule information corresponding to the size from the multiple periodic sleep schedule information.

In operation 1113, the source device 1101 can send a message including the periodic sleep schedule information to the sink device 1103. For example, the message can include a beacon message, a probe response message, or a P2P action frame.

In operation 1115, the sink device 1103 can synchronize with the source device 1101 according to the periodic sleep schedule information. The sink device 1103 can receive the message including the periodic sleep schedule information and synchronize a data communication period with the source device 1101 according to the periodic sleep schedule information.

In operation 1117, the source device 1101 can transmit substitute data to the sink device 1103 according to the periodic sleep schedule information. The source device 1101 can transmit the substitute data according to the periodic sleep schedule information.

In operation 1119, the sink device 1103 can receive and output the substitute data. For example, the sink device 1103 can receive the substitute data according to the periodic sleep schedule information and output the substitute data instead of the mirroring data.

In operation 1121, the source device 1101 can determine whether the display 260 is turned on. When the display 260 is turned on, the source device 1101 can proceed to operation 1123. Otherwise, the source device 1101 can go to operation 1117.

In operation 1123, the source device 1101 can stop the substitute data transmission and set existing schedule information (e.g., schedule information corresponding to the mirroring data). In operation 1125, the source device 1101 can send a message including the existing schedule information to the sink device 1103. For example, the message can include a beacon message or a probe response message. The source device 1101 can change the data communication period with the sink device 1103 based on the existing schedule information.

In operation 1127, the sink device 1103 can receive a message including the existing schedule information and synchronize the data communication period with the source device 1101 according to the existing schedule information.

In operation 1129, the source device 1101 can transmit mirroring data to the sink device 1103. For example, the source device 1101 can transmit the mirroring data according to the existing schedule information.

Figure 12:
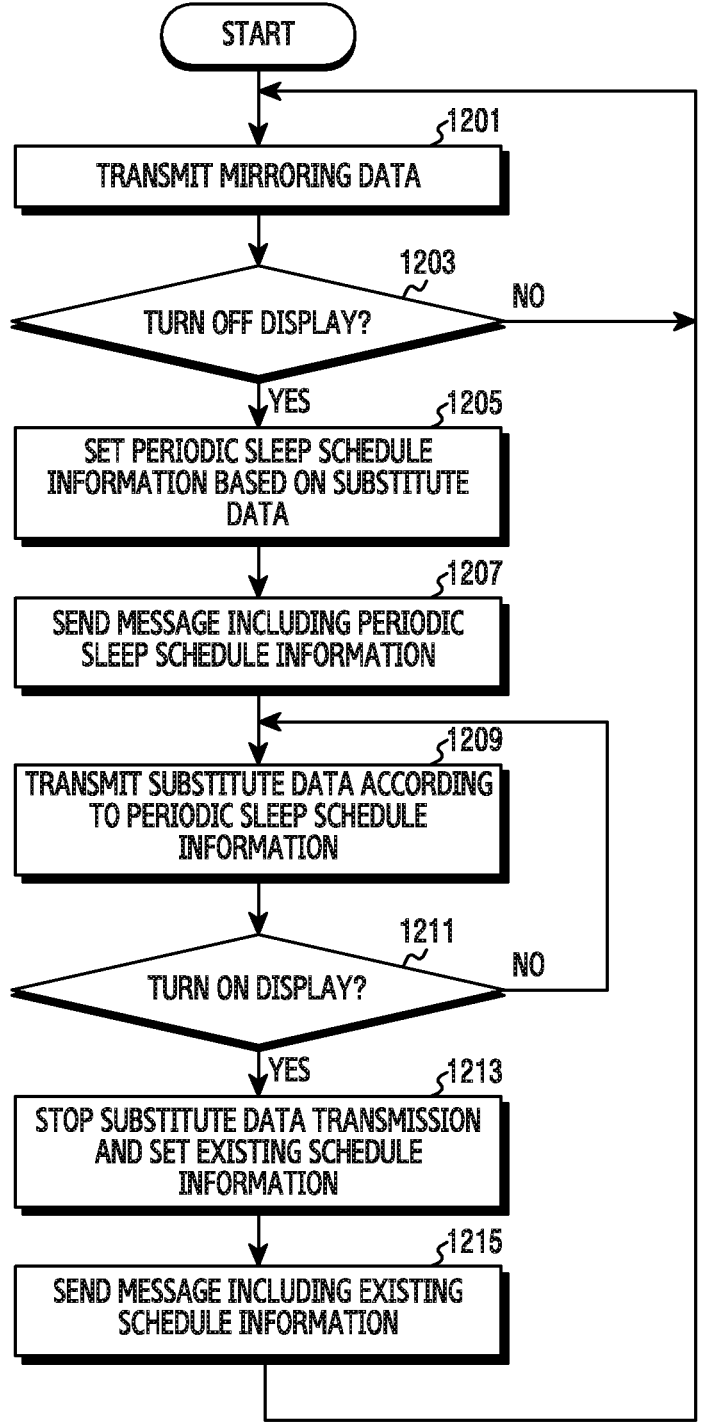
FIG. 12 illustrates a flowchart of data transmission in a source device according to one embodiment of the present disclosure.

FIG. 12 illustrates a flowchart of data transmission in a source device according to one embodiment of the present disclosure. For example, the source device 1101 can be the electronic device 101 of FIG. 1 or the first electronic device 401 of FIG. 4. For example, the source device 1101 can be the group owner. For example, the sink device 1103 can be the external electronic device 102 of FIG. 1 or the second electronic device 403 of FIG. 4. For example, the sink device 1103 can be the group client.

Referring to FIG. 12, in operation 1201, the source device 1101 (e.g., the processor 210) can transmit mirroring data. According to an embodiment, the processor 210 can transmit the mirroring data according to the schedule information corresponding to the mirroring data.

In operation 1203, the processor 210 can determine whether the display (e.g., the display 260) is turned off. When the display 260 is turned off, the processor 210 goes to operation 1205. Otherwise, the processor 210 can repeat operation 1201.

In operation 1205, the processor 210 can set the periodic sleep schedule information based on the substitute data. For example, the periodic sleep schedule information can include the information about the sleep interval for periodically deactivating the communication interface (e.g., the communication module 220).

According to an embodiment, the processor 210 can select the substitute data for the mirroring data. The processor 210 can determine the periodic sleep schedule information corresponding to the selected substitute data. For example, the processor 210 can determine the preset periodic sleep schedule information corresponding to the selected substitute data. For example, the processor 210 can determine the periodic sleep schedule information corresponding to the selected substitute data based on the property of the selected substitute data.

In operation 1207, the processor 210 can send the message including the periodic sleep schedule information to the sink device 1103. In operation 1209, the processor 210 can transmit the substitute data to the sink device 1103 according to the periodic sleep schedule information. For example, when the proportion of the active interval and the sleep interval of the determined schedule is 3:7, the processor 210 can transmit the substitute content for 3/10 hours of one period and stop the substitute content transmission for 7/10 hours of one period.

In operation 1211, the processor 210 can determine whether the display 260 is turned on. When the display 260 is turned on, the processor 210 can proceed to operation 1213. Otherwise, the processor 210 can repeat operation 1209.

In operation 1213, the processor 210 can stop the substitute data transmission and set the existing schedule information (e.g., schedule information corresponding to the mirroring data). For example, the processor 210 can change the data communication period from the periodic sleep schedule information to the existing schedule information.

In operation 1215, the processor 210 can transmit the message including the existing schedule information to the sink device 1103 and then go back to operation 1201.

Figure 13:
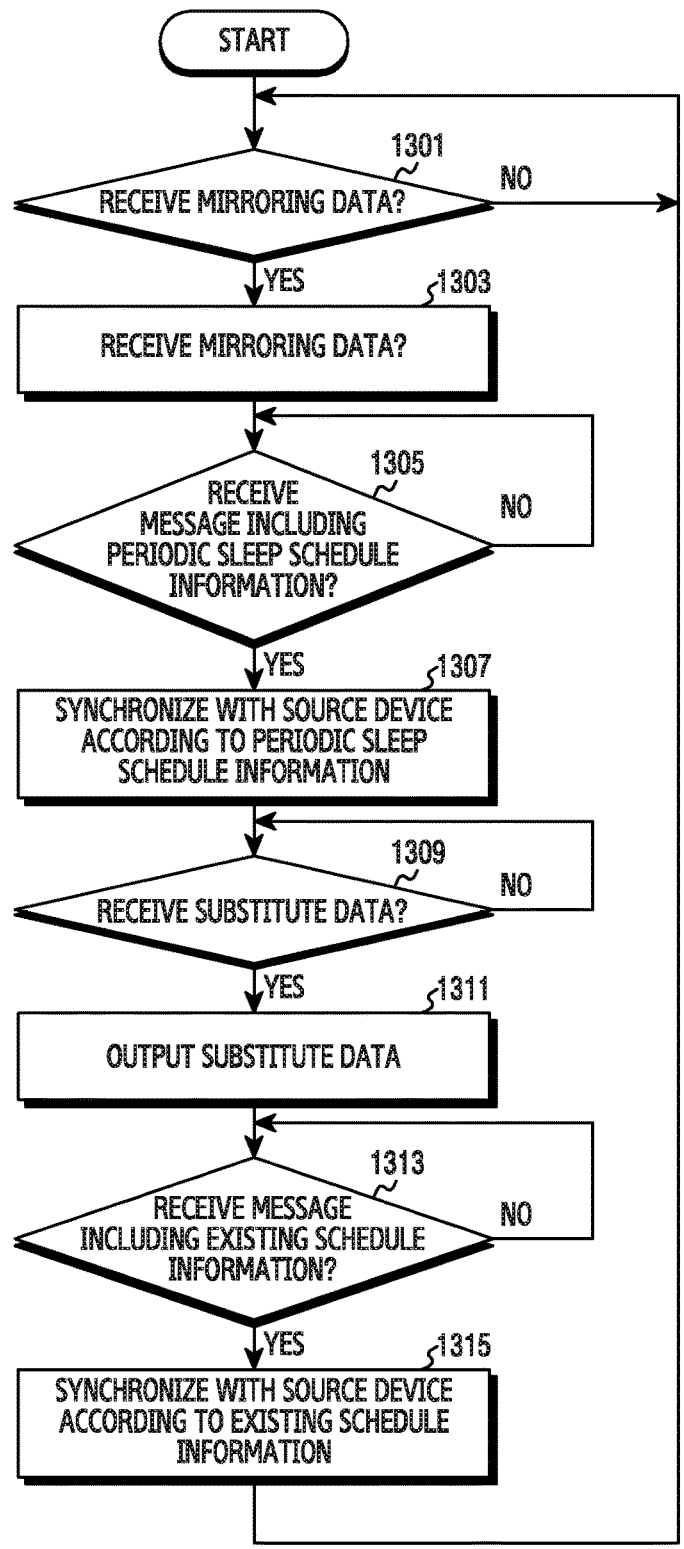
FIG. 13 illustrates a flowchart of data reception in a sink device according to one embodiment of the present disclosure.

FIG. 13 illustrates a flowchart of data reception in a sink device according to one embodiment of the present disclosure. For example, the source device 1101 can be the electronic device 101 of FIG. 1 or the first electronic device 401 of FIG. 4. For example, the source device 1101 can be the group owner. For example, the sink device 1103 can be the external electronic device 102 of FIG. 1 or the second electronic device 403 of FIG. 4. For example, the sink device 1103 can be the group client.

In operation 1301, the sink device 1101 (e.g., the processor 210) can determine whether the mirroring data is received from the source device 1101. According to an embodiment, the processor 210 can receive the mirroring data according to the schedule information corresponding to the mirroring data.

When receiving the mirroring data, the processor 210 goes to operation 1303. Otherwise, the processor 210 repeats operation 1301.

In operation 1303, the processor 210 can output the received mirroring data. In operation 1305, the processor 210 can determine whether the message including the periodic sleep schedule information is received from the source device 1101. When receiving the message, the processor 210 goes to operation 1307. Otherwise, the processor 210 can repeat operation 1305.

In operation 1307, the processor 210 can synchronize with the source device 1101 according to the periodic sleep schedule information. For example, when the proportion of the active interval and the sleep interval per period in the periodic sleep schedule information is 3:7, the processor 210 can control the communication module 220 to receive the substitute content for 3/10 hours of one period and to stop the substitute content reception for 7/10 hours of one period. For example, the processor 210 can control the power of the communication module 220 according to the periodic sleep schedule information. For example, the processor 210 can control the power of the WIFI module 223 of the communication module 220 according to the periodic sleep schedule information.

In operation 1309, the processor 210 can determine whether the substitute data is received from the source device 1101. When receiving the substitute data, the processor 210 goes to operation 1311. Otherwise, the processor 210 can repeat operation 1309.

In operation 1311, the processor 210 can output the substitute data. For example, when the substitute data is video data, the processor 210 can display the substitute data on the display 260. For example, when the substitute data is audio data, the processor 210 can output the substitute data through the speaker 282. For example, when the substitute data is multimedia data, the processor 210 can display the substitute data through the display 260 and the speaker 282.

In operation 1313, the processor 210 can determine whether the message including the existing schedule information is received from the source device 1101. For example, the existing schedule information can be the schedule information corresponding to the mirroring data.

When receiving the message including the existing schedule information, the processor 210 goes to operation 1315. Otherwise, the processor 210 can repeat operation 1313.

In operation 1315, the processor 210 can synchronize with the source device 1101 according to the existing schedule information and go to operation 1301. When the proportion of the active interval and the sleep interval per period is 1:0 in the existing schedule information, the processor 210 can control the communication module 220 to continuously receive the mirroring data throughout the period. For example, the processor 210 can control the power of the communication module 220 according to the existing schedule information. For example, the processor 210 can control the power of the WIFI module 223 of the communication module 220 according to the existing schedule information.

Figure 14:
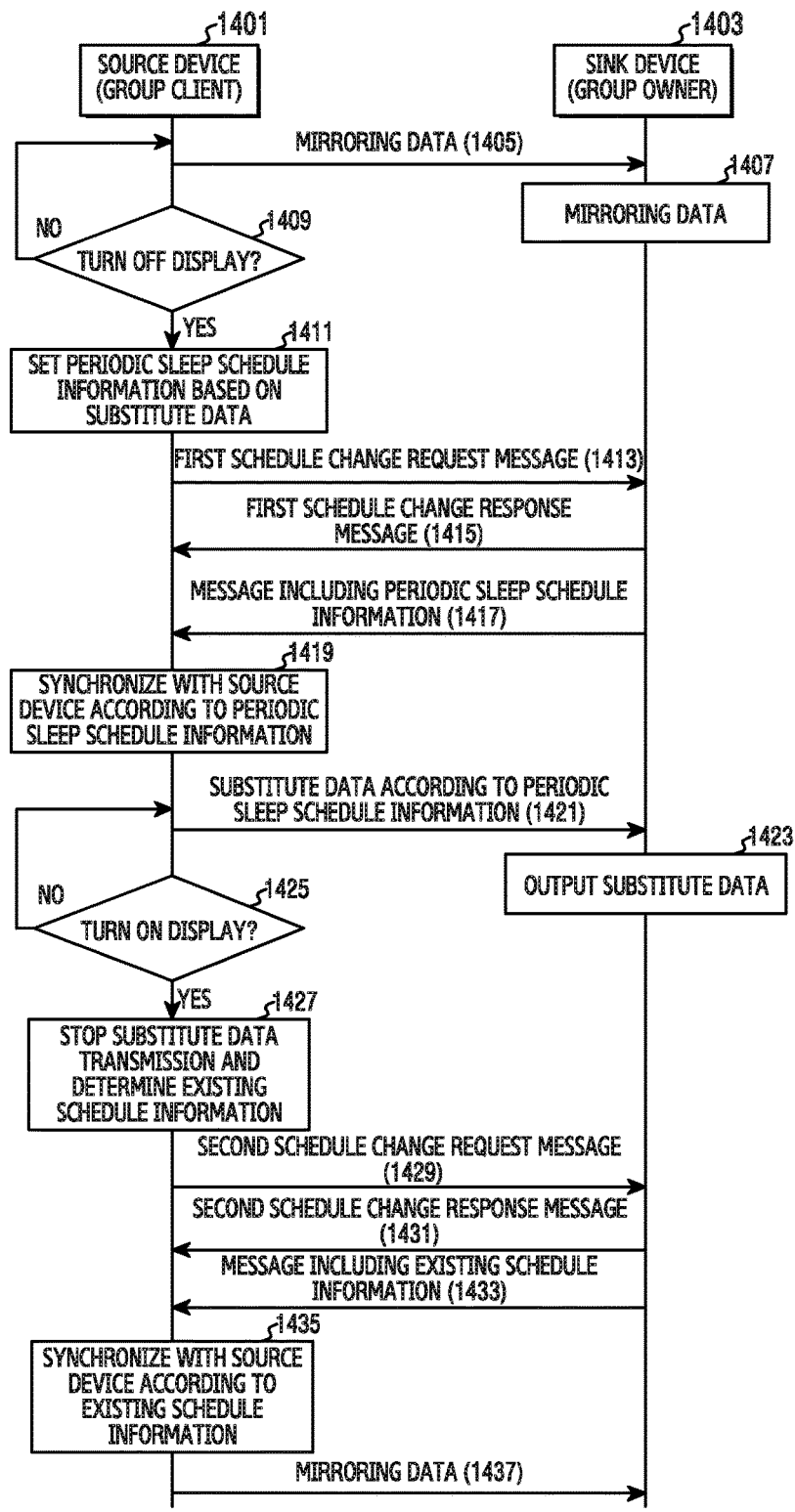
FIG. 14 illustrates a flowchart of data transmission in a communication system according to another embodiment of the present disclosure.

FIG. 14 illustrates another flowchart of data transmission in a communication system according to an embodiment of the present disclosure. For example, the communication system can include a source device 1401 and a sink device 1403. For example, the source device 1401 can be the electronic device 101 of FIG. 1 or the first electronic device 401 of FIG. 4. For example, the source device 1401 can be a group client. For example, the sink device 1403 can be the external electronic device 102 of FIG. 1 or the second electronic device 403 of FIG. 4. For example, the sink device 1403 can be a group owner.

Referring to FIG. 14, in operation 1405, the source device 1401 can transmit mirroring data to the sink device 1403. According to an embodiment, the source device 1401 can transmit mirroring data according to schedule information corresponding to the mirroring data. For example, the schedule information corresponding to the mirroring data can set the proportion of the active interval and the sleep interval per period to 1:0.

In operation 1407, the sink device 1403 can receive and output the mirroring data. In operation 1409, the source device 1401 can determine whether the source device's display (e.g., the display 260) is turned off. When the display 260 is turned off, the source device 1401 goes to operation 1411. Otherwise, the source device 1401 can repeat operation 1405.

In operation 1411, the source device 1401 can set periodic sleep schedule information based on substitute data. For example, the periodic sleep schedule information can include information about the sleep interval and the active interval to periodically deactivate or activate a communication interface (e.g., the communication module 220).

According to an embodiment, the source device 1401 can select substitute data for the mirroring data and determine periodic sleep schedule information corresponding to the selected substitute data.

In operation 1413, the source device 1401 can generate and send a first schedule change request message to the sink device 1403. The first schedule change request message can be a P2P action frame.

According to an embodiment, the first schedule change request message can include the periodic sleep schedule information. The first schedule change request message can include the periodic sleep schedule information and state information of the source device 1401. For example, the state information of the source device 1401 can include information indicating the power-off of the display 260 of the source device 1401.

In operation 1415, the sink device 1403 can generate and send a first schedule change response message to the source device 1401 in response to the first schedule change request message. For example, the first schedule change response message can include a response (e.g., approval or rejection for the schedule change) for the first schedule change request message.

According to an embodiment, the sink device 1403 can determine whether the substitute data can be scheduled based on the periodic sleep schedule information of the first schedule change request message. When the scheduling is possible, the sink device 1403 can generate and send the first schedule change response message including the schedule change approval. When the scheduling is infeasible, the sink device 1403 can generate and send the first schedule change response message including the schedule change rejection.

According to an embodiment, based on the state information of the source device 1401 of the first schedule change request message, the sink device 1403 can output the state of the source device 1401. For example, the sink device 1403 can display information or output a voice indicating the power-off of the display 260 of the source device 1401, or output a combination of them.

In operation 1417, the sink device 1403 can generate and send a message including the periodic sleep schedule information to the source device 1401. For example, the message including the periodic sleep schedule information can be a beacon message, a probe response message, or a separate P2P action frame.

When the scheduling changes, the sink device 1403 can generate and send to the source device 1401 the message including the periodic sleep schedule information. The sink device 1403 can change the data communication period from the schedule information corresponding to the mirroring data to the periodic sleep schedule information.

In operation 1419, the source device 1401 can synchronize with the sink device 1403 according to the periodic sleep schedule information. For example, the source device 1401 can receive the message including the periodic sleep schedule information and synchronize the data communication period with the sink device 1403 according to the periodic sleep schedule information.

In operation 1421, the source device 1401 can transmit substitute data to the sink device 1403 according to the periodic sleep schedule information. For example, when the proportion of the active interval and the sleep interval per period is 3:7 in the periodic sleep schedule information, the source device 1401 can transmit the substitute data for 3/10 hours of one period and stop the substitute data transmission for 7/10 hours of one period.

In operation 1423, the sink device 1403 can receive and output the substitute data. In operation 1425, the source device 1401 can determine whether the display 260 is turned on. When the display 260 is turned on, the source device

1401 can proceed to operation 1427. Otherwise, the source device 1401 can proceed to operation 1421.

In operation 1427, the source device 1401 can stop the substitute data transmission and determine existing schedule information (e.g., schedule information corresponding to the mirroring data).

In operation 1429, the source device 1401 can generate and send a second schedule change request message to the sink device 1403. According to an embodiment, the second schedule change request message can be a P2P action frame. The second schedule change request message can include the existing schedule information.

In operation 1431, the sink device 1403 can generate and send a second schedule change response message to the source device 1401 in response to the second schedule change request message. For example, the second schedule change response message can include a response (e.g., approval or rejection for the schedule change) for the second schedule change request message.

According to an embodiment, the sink device 1403 can determine whether the mirroring data can be scheduled based on the existing sleep schedule information of the second schedule change request message. When the scheduling is possible, the sink device 1403 can generate and send the second schedule change response message including the schedule change approval. When the scheduling is infeasible, the sink device 1403 can generate and send the second schedule change response message including the schedule change rejection.

In operation 1433, the sink device 1403 can generate and send a message including the existing schedule information to the source device 1401. For example, the message including the existing schedule information can be a beacon message, a probe response message, or a separate P2P action frame.

According to an embodiment, when the scheduling is changed, the sink device 1403 can generate and send a message including the existing schedule information to the source device 1401. The sink device 1403 can change the data communication period according to the existing schedule information.

In operation 1435, the source device 1401 can synchronize with the sink device 1403 according to the existing schedule information. For example, the source device 1401 can receive the message including the existing schedule information and synchronize the data communication period with the sink device 1403 according to the existing schedule information.

In operation 1437, the source device 1401 can transmit mirroring data to the sink device 1403. For example, the source device 1401 can transmit the mirroring data according to the existing schedule information.

Figure 15A:
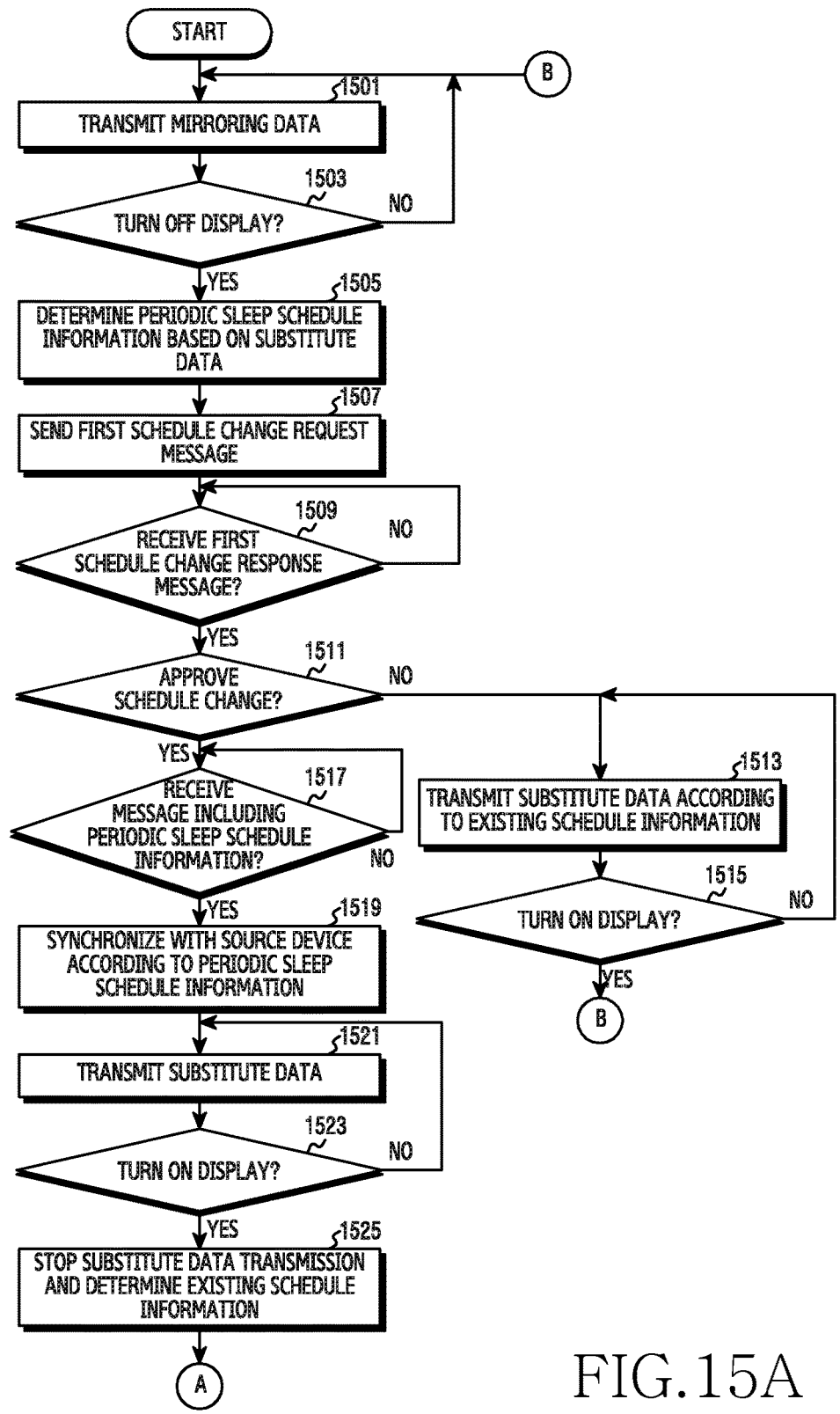
FIGS. 15A and 15B illustrate flowcharts of data transmission in a source device according to another embodiment of the present disclosure.
Figure 15B:
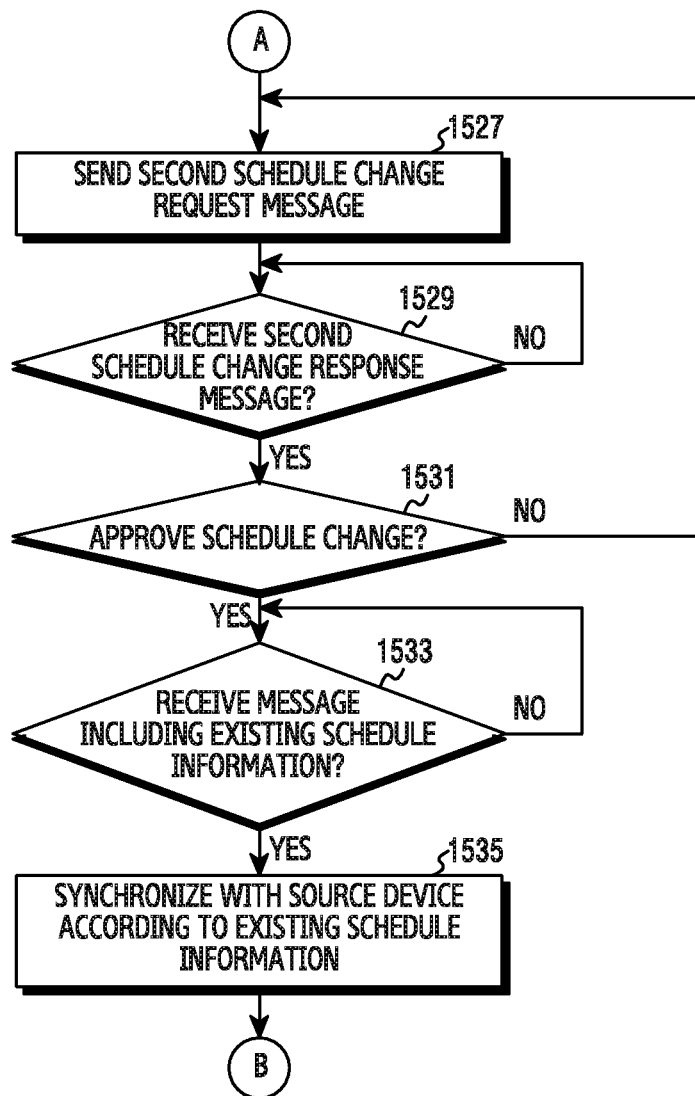

FIGS. 15A and 15B illustrate flowcharts of data transmission in a source device according to an embodiment of the present disclosure. For example, the source device 1401 can be the electronic device 101 of FIG. 1 or the first electronic device 401 of FIG. 4. For example, the source device 1401 can be the group client. For example, the sink device 1403 can be the external electronic device 102 of FIG. 1 or the second electronic device 403 of FIG. 4. For example, the sink device 1403 can be the group owner.

Referring to FIGS. 15A and 15B, in operation 1501, the source device 1401 (e.g., the processor 210) can transmit the mirroring data. According to an embodiment, the processor 210 can transmit the mirroring data according to the schedule information corresponding to the mirroring data.

In operation 1503, the processor 210 can determine whether the display (e.g., the display 260) is turned off. When the display 260 is turned off, the processor 210 goes to operation 1505. Otherwise, the processor 210 can repeat operation 1501.

In operation 1505, the processor 210 can determine the periodic sleep schedule information based on the substitute data. For example, the periodic sleep schedule information can include the information about the sleep interval for periodically deactivating the communication interface (e.g., the communication module 220).

According to an embodiment, the processor 210 can select the substitute data for the mirroring data. The processor 210 can set the periodic sleep schedule information corresponding to the selected substitute data. For example, the processor 210 can set the preset periodic sleep schedule information corresponding to the selected substitute data. For example, the processor 210 can determine the periodic sleep schedule information corresponding to the selected substitute data based on the property of the selected substitute data.

In operation 1507, the processor 210 can send the first schedule change request message to the sink device 1403. For example, the first schedule change request message can request the schedule change of the sink device 1403. For example, the first schedule change request message can include the periodic sleep schedule information.

In operation 1509, the processor 210 can determine whether the first schedule change response message is received from the sink device 1403. For example, the first schedule change response message is the response message of the first schedule change request message and can include the response (e.g., approval or rejection for the schedule change) for the schedule change.

Upon receiving the first schedule change response message, the processor 210 goes to operation 1511. Otherwise, the processor 210 can repeat operation 1509.

In operation 1511, the processor 210 can determine based on the first schedule change response message whether the sink device 1403 approves the schedule change. When the schedule change is approved, the processor 210 goes to operation 1517. Otherwise, for example, when the schedule change is rejected, the processor 210 can go to operation 1513.

In operation 1513, the processor 210 can transmit the substitute data according to the existing schedule information (e.g., the schedule information corresponding to the mirroring data). In operation 1515, the processor 210 can determine whether the display 260 is turned on. When the display 260 is turned on, the processor 210 can proceed to operation 1501. Otherwise, the processor 210 can proceed to operation 1513.

In operation 1517, the processor 210 can determine whether the message including the periodic sleep schedule information is received from the sink device 1403. When receiving the message, the processor 210 can proceed to operation 1519. Otherwise, the processor 210 can repeat operation 1517.

In operation 1519, the processor 210 can synchronize with the sink device 1403 according to the periodic sleep schedule information. For example, when the proportion of the active interval and the sleep interval of the periodic sleep schedule information is 3:7, the processor 210 can control the communication module 220 to transmit the substitute data for 3/10 hours of one period and to stop the substitute data transmission for 7/10 hours of one period.

For example, the processor 210 can control the power of the communication module 220 according to the periodic sleep schedule information. For example, the processor 210 can control the power of the WIFI module 223 of the communication module 220 according to the periodic sleep schedule information.

In operation 1521, the processor 210 can transmit the substitute data to the sink device 1403. For example, the processor 210 can transmit the substitute data according to the periodic sleep schedule information.

In operation 1523, the processor 210 can determine whether the display 260 is turned on. When the display 260 is turned on, the processor 210 can proceed to operation 1525. Otherwise, the processor 210 can proceed to operation 1521.

In operation 1525, the processor 210 can stop the substitute data transmission and determine the existing schedule information (e.g., the schedule information corresponding to the mirroring data).

In operation 1527, the processor 210 can send the second schedule change request message. For example, the second schedule change request message can request the schedule change. For example, the second schedule change request message can include the existing schedule information.

In operation 1529, the processor 210 can determine whether the second schedule change response message is received from the sink device 1403. For example, the second schedule change response message is the response message of the second schedule change request message and can include the response (e.g., approval or rejection for the schedule change) for the schedule change.

Upon receiving the second schedule change response message, the processor 210 goes to operation 1531. Otherwise, the processor 210 can repeat operation 1529.

In operation 1531, the processor 210 can determine based on the second schedule change response message whether the sink device 1403 approves the schedule change. When the schedule change is approved, the processor 210 goes to operation 1533. Otherwise, for example, when the schedule change is rejected, the processor 210 can transmit the second schedule change request message until the schedule change is approved in operation 1527.

In operation 1533, the processor 210 can determine whether the message including the existing schedule information is received from the sink device 1403. When receiving the message, the processor 210 can proceed to operation 1535. Otherwise, the processor 210 can repeat operation 1533.

The processor 210 can synchronize with the sink device 1403 according to the existing schedule information in operation 1535 and then proceed to operation 1501. When the proportion of the active interval and the sleep interval per period is 1:0 in the existing schedule information, the processor 210 can control the communication module 220 to continuously transmit the mirroring data throughout the period. The processor 210 can control the power of the communication module 220 according to the existing schedule information. The processor 210 can control the power of the WIFI module 223 of the communication module 220 according to the existing schedule information.

Figure 16:
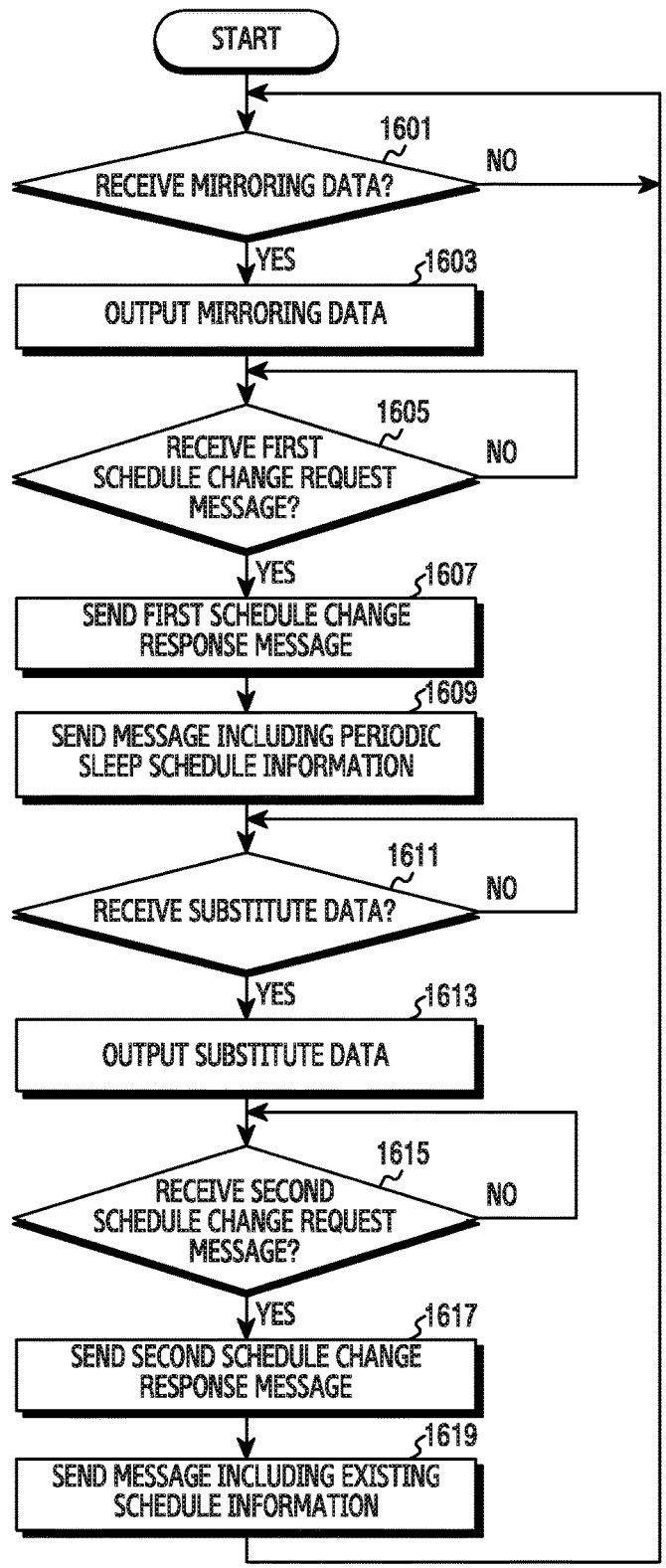
FIG. 16 illustrates a flowchart of data reception in a sink device according to another embodiment of the present disclosure.

FIG. 16 illustrates a flowchart of data reception in a sink device according to an embodiment of the present disclosure. For example, the source device 1401 can be the electronic device 101 of FIG. 1 or the first electronic device 401 of FIG. 4. For example, the source device 1401 can be the group client. For example, the sink device 1403 can be the external electronic device 102 of FIG. 1 or the second electronic device 403 of FIG. 4. For example, the sink device 1403 can be the group owner.

In operation 1601, the sink device 1403 (e.g., the processor 210) can determine whether the mirroring data is received from the source device 1401. According to an embodiment, the processor 210 can receive the mirroring data according to schedule information corresponding to the mirroring data.

When receiving the mirroring data, the processor 210 goes to operation 1603. Otherwise, the processor 210 can repeat operation 1601.

In operation 1603, the processor 210 can output the received mirroring data. In operation 1605, the processor 210 can determine whether the first schedule change request message is received from the source device 1401. When receiving the first schedule change request message, the processor 210 goes to operation 1607. Otherwise, the processor 210 can repeat operation 1605.

In operation 1607, the processor 210 can send the first schedule change response message to the source device 1401 in response to the first schedule change request message. The processor 210 can determine whether the schedule can be changed based on the periodic sleep schedule information of the first schedule change request message, and generate and send the first schedule change response message including a determination result (e.g., approval or rejection for the schedule change).

In operation 1609, the processor 210 can send the message including the periodic sleep schedule information to the source device 1401. When the scheduling changes, the processor 210 can generate and send the message including the periodic sleep schedule information to the source device 1401. The processor 210 can change the data communication period according to the periodic sleep schedule information.

In operation 1611, the processor 210 can determine whether substitute data is received from the source device 1401. For example, the processor 210 can receive the substitute data according to the periodic sleep schedule information. When receiving the substitute data, the processor 210 goes to operation 1613. Otherwise, the processor 210 can repeat operation 1611.

In operation 1613, the processor 210 can output the substitute data. In operation 1615, the processor 210 can determine whether the second schedule change request message is received from the source device 1401. For example, the second schedule change request message can include the existing schedule information (e.g., the schedule information corresponding to the mirroring data).

When receiving the second schedule change request message, the processor 210 goes to operation 1617. Otherwise, the processor 210 can repeat operation 1615.

In operation 1617, the processor 210 can send the second schedule change response message to the source device 1401 in response to the second schedule change request message. The processor 210 can determine whether the schedule can be changed based on the periodic sleep schedule information of the second schedule change request message, and generate and send the second schedule change response message including a determination result (e.g., approval or rejection for the schedule change).

The processor 210 can send the message including the existing schedule information to the source device 1401 in operation 1619 and then go to operation 1601. When changing the schedule based on the existing schedule information, the processor 210 can generate and send to the source device 1401 the message including the existing schedule information. The processor 210 can change the data communication period according to the existing schedule information.

Figure 17:
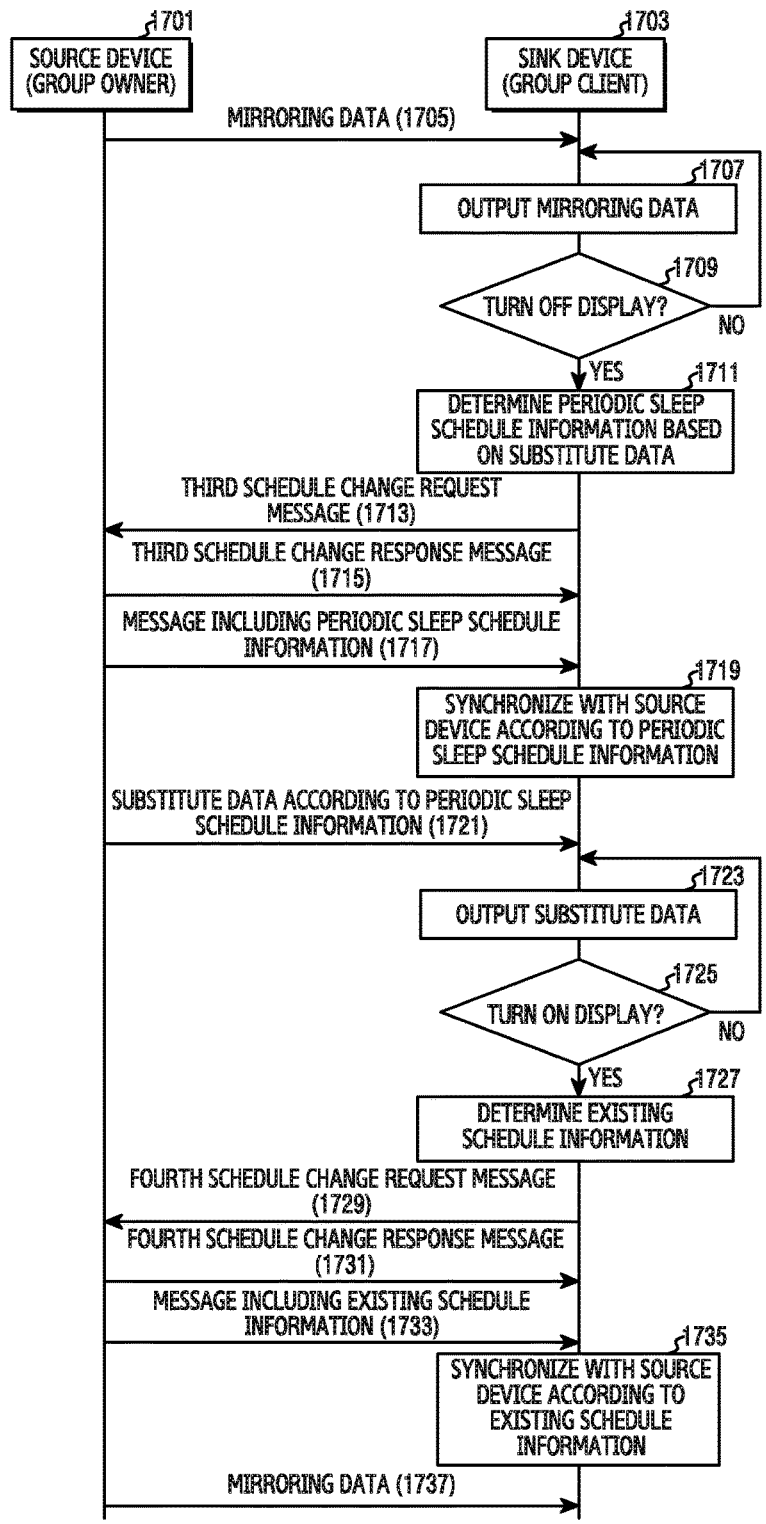
FIG. 17 illustrates a flowchart of data transmission in a communication system according to yet another embodiment of the present disclosure.

FIG. 17 illustrates yet another flowchart of data transmission in a communication system according to an embodiment of the present disclosure. For example, the communication system can include a source device 1701 and a sink device 1703. For example, the source device 1701 can be the electronic device 101 of FIG. 1 or the first electronic device 401 of FIG. 4. For example, the source device 1701 can be a group owner. For example, the sink device 1703 can be the external electronic device 102 of FIG. 1 or the second electronic device 403 of FIG. 4. For example, the sink device 1703 can be a group client.

For example, the source device 1701 and the sink device 1703 can be electronic devices including a display (e.g., the display 260) and a battery (e.g., the battery 296). For example, the source device 1701 can be a smartphone, and the sink device 1703 can be a notebook including the greater display 260 than the smartphone.

Referring to FIG. 17, in operation 1705, the source device 1701 can transmit mirroring data to the sink device 1703. According to an embodiment, the source device 1701 can transmit mirroring data according to schedule information corresponding to the mirroring data. For example, the schedule information corresponding to the mirroring data can set the proportion of the active interval and the sleep interval per period to 1:0.

In operation 1707, the sink device 1703 can receive and output the mirroring data. In operation 1709, the sink device 1703 can determine whether the sink's display 260 is turned off. When the display 260 is turned off, the sink device 1703 can proceed to operation 1711. Otherwise, the sink device 1703 can proceed to operation 1707.

In operation 1711, the sink device 1703 can determine periodic sleep schedule information based on substitute data. For example, the periodic sleep schedule information can include information about the sleep interval and the active interval to periodically deactivate or activate a communication interface (e.g., the communication module 220).

According to an embodiment, the sink device 1703 can select the substitute data for the mirroring data. For example, the substitute data can be preset. For example, the substitute data can be selected by the user from at least one data stored in a memory (e.g., the memory 230). For example, the substitute data can be determined by the user before receiving the mirroring data or when turning off the display 260.

According to an embodiment, the sink device 1703 can determine periodic sleep schedule information corresponding to the selected substitute data. For example, the periodic sleep schedule information corresponding to the selected substitute data can be determined by the selected substitute data or based on the property of the selected substitute data.

In operation 1713, the sink device 1703 can generate and send a third schedule change request message to the source device 1701. The third schedule change request message can be a P2P action frame.

According to an embodiment, the third schedule change request message can include the periodic sleep schedule information. The third schedule change request message can include the periodic sleep schedule information and state information of the sink device 1703. For example, the state information of the sink device 1703 can include information indicating the power-off of the display 260 of the sink device 1703.

According to an embodiment, the third schedule change request message can include at least one of the periodic sleep schedule information, the state information of the sink device 1703, and the substitute data.

In operation 1715, in response to the third schedule change request message, the source device 1701 can generate and send a third schedule change response message to the sink device 1703. For example, the third schedule change response message can include a response (e.g., approval or rejection for the schedule change) for the third schedule change request message.

According to an embodiment, the source device 1701 can determine whether the substitute data can be scheduled based on the periodic sleep schedule information of the third schedule change request message. When the scheduling is possible, the source device 1701 can generate and send the third schedule change response message including the schedule change approval. When the scheduling is infeasible, the source device 1701 can generate and send the third schedule change response message including the schedule change rejection.

According to an embodiment, based on the state information of the sink device 1703 of the third schedule change request message, the source device 1701 can output the state of the sink device 1703. For example, the source device 1701 can display information or output a voice indicating the power-off of the display 260 of the sink device 1703, or output a combination of them.

In operation 1717, the source device 1701 can generate and send a message including the periodic sleep schedule information to the sink device 1703. For example, the message including the periodic sleep schedule information can be a beacon message, a probe response message, or a separate P2P action frame.

According to an embodiment, when the scheduling changes, the source device 1701 can generate and send the message including the periodic sleep schedule information to the sink device 1703. The source device 1701 can change the data communication period according to the periodic sleep schedule information.

In operation 1719, the sink device 1703 can synchronize with the source device 1701 according to the periodic sleep schedule information. For example, the sink device 1703 can receive the message including the periodic sleep schedule information and synchronize the data communication period with the source device 1701 according to the periodic sleep schedule information.

In operation 1721, the source device 1701 can transmit substitute data to the sink device 1703 according to the periodic sleep schedule information. For example, the substitute data can be contained in the third schedule change request message. For example, when the proportion of the active interval and the sleep interval of the periodic sleep schedule information is 3:7, the source device 1701 can transmit the selected substitute content for 3/10 hours of one period and stop the substitute data transmission for 7/10 hours of one period.

In operation 1723, the sink device 1703 can receive and output the substitute data. In operation 1725, the sink device 1703 can determine whether the display 260 is turned on. When the display 260 is turned on, the sink device 1703 can proceed to operation 1727. Otherwise, the sink device 1703 can proceed to operation 1723.

In operation 1727, the sink device 1703 can determine existing schedule information (e.g., the schedule information corresponding to the mirroring data).

In operation 1729, the sink device 1703 can generate and send a fourth schedule change request message to the source device 1701. The fourth schedule change request message can be a P2P action frame. The fourth schedule change request message can include the existing schedule information.

In operation 1731, in response to the fourth schedule change request message, the source device 1701 can generate and send a fourth schedule change response message to the sink device 1703. For example, the fourth schedule change response message can include a response (e.g., approval or rejection for the schedule change) for the fourth schedule change request message.

According to an embodiment, the source device 1701 can determine whether the mirroring data can be scheduled based on the existing schedule information of the fourth schedule change request message. When the scheduling is possible, the source device 1701 can generate and send the fourth schedule change response message including the schedule change approval. When the scheduling is infeasible, the source device 1701 can generate and send the fourth schedule change response message including the schedule change rejection.

In operation 1733, the source device 1701 can generate and send a message including the existing schedule information to the sink device 1703. For example, the message including the existing schedule information can be a beacon message, a probe response message, or a separate P2P action frame.

According to an embodiment, when the scheduling changes, the source device 1701 can generate and send the message including the existing schedule information to the sink device 1703. The source device 1701 can change the data communication period according to the existing schedule information.

In operation 1735, the sink device 1703 can synchronize with the source device 1701 according to the existing schedule information. For example, the sink device 1703 can receive the message including the existing schedule information and synchronize the data communication period with the source device 1701 according to the existing schedule information.

In operation 1737, the source device 1701 can transmit mirroring data to the sink device 1703. For example, the source device 1701 can transmit the mirroring data according to the existing schedule information.

Figure 18:
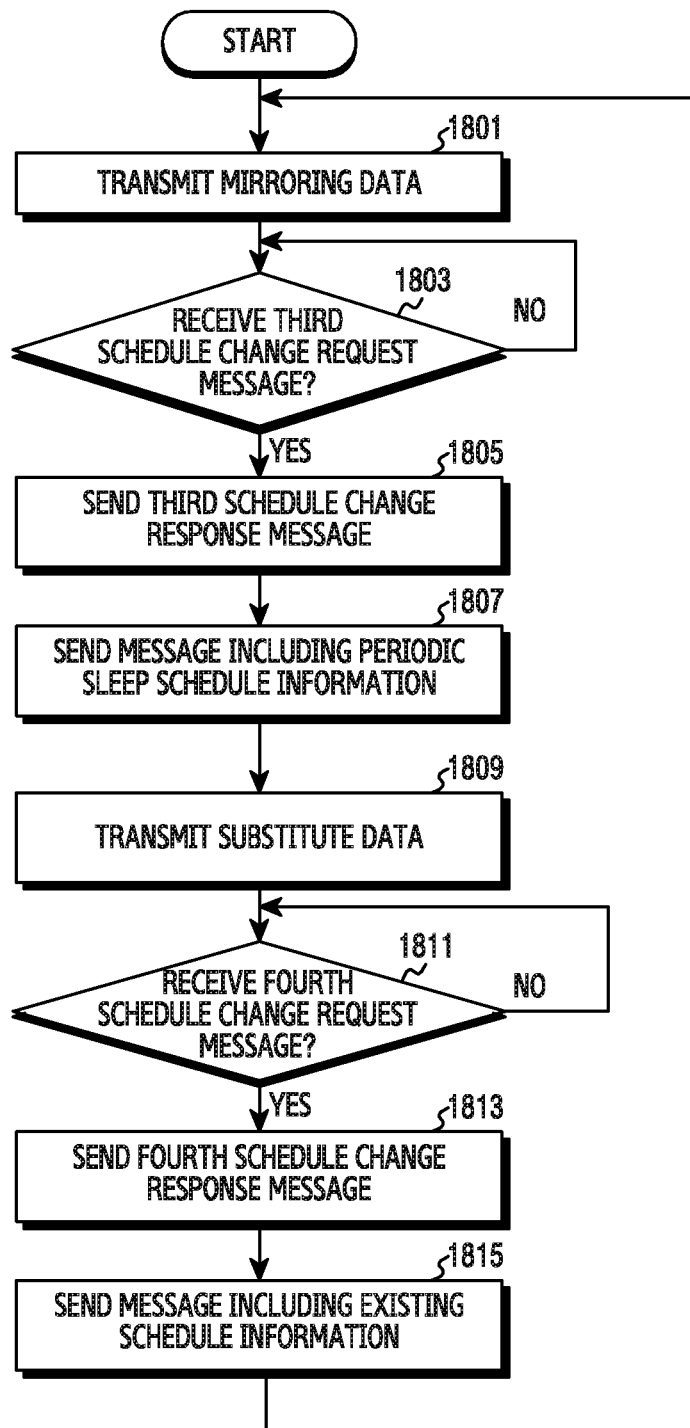
FIG. 18 illustrates a flowchart of data transmission in a source device according to yet another embodiment of the present disclosure.

FIG. 18 illustrates yet another flowchart of data transmission in a source device according to an embodiment of the present disclosure. For example, the source device 1701 can be the electronic device 101 of FIG. 1 or the first electronic device 401 of FIG. 4. For example, the source device 1701 can be the group owner. For example, the sink device 1703 can be the external electronic device 102 of FIG. 1 or the second electronic device 403 of FIG. 4. For example, the sink device 1703 can be the group client.

Referring to FIG. 18, in operation 1801, the source device 1701 (e.g., the processor 210) can transmit the mirroring data. According to an embodiment, the processor 210 can transmit the mirroring data according to the schedule information corresponding to the mirroring data.

In operation 1803, the processor 210 can determine whether the third schedule change request message is received from the sink device 1703. When receiving the third schedule change request message, the processor 210 goes to operation 1805. Otherwise, the processor 210 can repeat operation 1803.

In operation 1805, the processor 210 can send the third schedule change response message to the sink device 1703 in response to the third schedule change request message. The processor 210 can determine whether the schedule can be changed based on the periodic sleep schedule information of the third schedule change request message, and generate and send the third schedule change response message including the response (e.g., approval or rejection for the schedule change).

In operation 1807, the processor 210 can send the message including the periodic sleep schedule information to the sink device 1703. When the schedule (e.g., the data communication period) is changed based on the periodic sleep schedule information, the processor 210 can generate and send the message including the periodic sleep schedule information. The processor 210 can change the data communication period according to the periodic sleep schedule information.

In operation 1809, the processor 210 can transmit the substitute data to the sink device 1703. In operation 1811, the processor 210 can determine whether the fourth schedule change request message is received from the sink device 1703. For example, the fourth schedule change request message can include the existing schedule information (e.g., the schedule information corresponding to the mirroring data).

Upon receiving the fourth schedule change request message, the processor 210 goes to operation 1813. Otherwise, the processor 210 can repeat operation 1811.

In operation 1813, the processor 210 can generate and send the fourth schedule change response message to the sink device 1703 in response to the fourth schedule change request message. The processor 210 can determine whether the schedule can be changed based on the periodic sleep schedule information of the fourth schedule change request message, and generate and send the fourth schedule change response message including the determination result (e.g., approval or rejection for the schedule change).

The processor 210 can send the message including the existing schedule information to the sink device 1703 in operation 1815 and then proceed to operation 1801. When the schedule is changed based on the existing schedule information, the processor 210 can generate and send the message including the existing schedule information. The processor 210 can change the data communication period according to the existing schedule information.

Figure 19A:
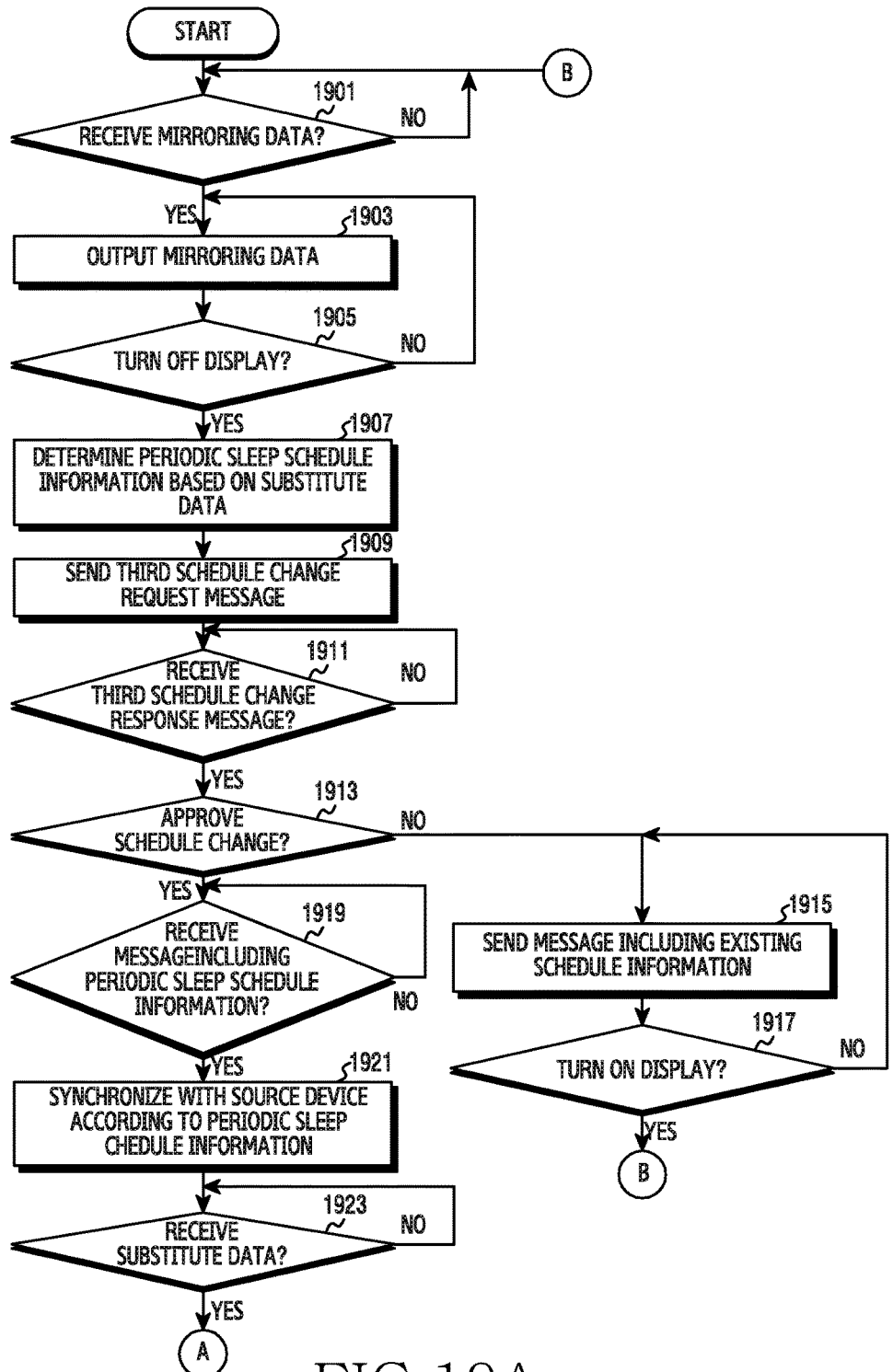
FIGS. 19A and 19B illustrate flowcharts of data reception in a sink device according to yet another embodiment of the present disclosure.
Figure 19B:
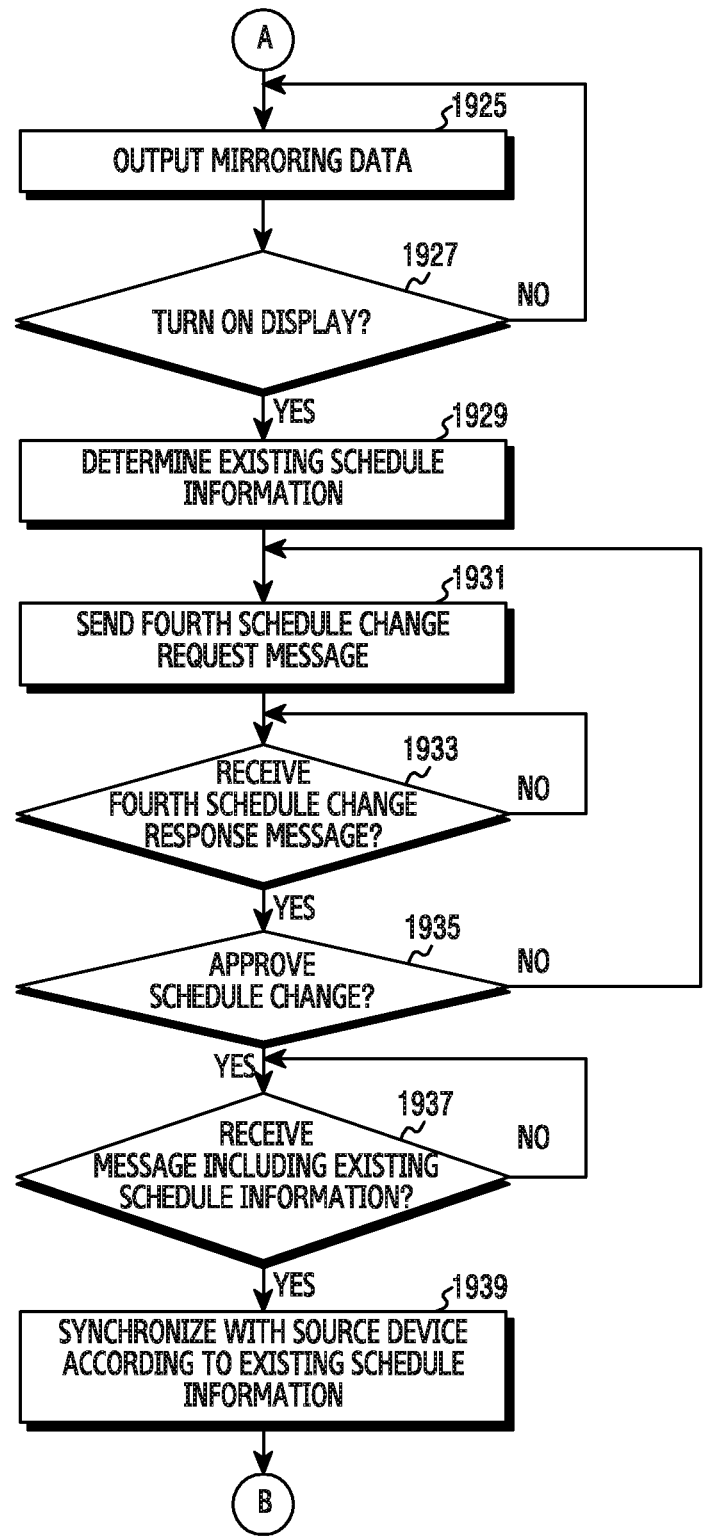

FIGS. 19A and 19B illustrate flowcharts of data reception in a sink device according to an embodiment of the present disclosure. For example, the source device 1701 can be the electronic device 101 of FIG. 1 or the first electronic device 401 of FIG. 4. For example, the source device 1701 can be the group owner. For example, the sink device 1703 can be the external electronic device 102 of FIG. 1 or the second electronic device 403 of FIG. 4. For example, the sink device 1403 can be the group client.

Referring to FIGS. 19A and 19B, in operation 1901, the sink device 1703 (e.g., the processor 210) can determine whether the mirroring data is received from the source device 1701. According to an embodiment, the processor 210 can receive the mirroring data according to the schedule information corresponding to the mirroring data.

When receiving the mirroring data, the processor 210 goes to operation 1903. Otherwise, the processor 210 can repeat operation 1901.

In operation 1903, the processor 210 can output the mirroring data. In operation 1905, the processor 210 can determine whether the display (e.g., the display 260) is turned off. When the display 260 is turned off, the processor 210 can proceed to operation 1907. Otherwise, the processor 210 can proceed to operation 1903.

In operation 1907, the processor 210 can determine the periodic sleep schedule information based on the substitute data. For example, the periodic sleep schedule information can include the information about the sleep interval for periodically deactivating the communication interface (e.g., the communication module 220).

According to an embodiment, the processor 210 can select the substitute data for the mirroring data. The processor 210 can determine the periodic sleep schedule information of the selected substitute data. For example, the processor 210 can determine preset periodic sleep schedule information of the selected substitute data. For example, the processor 210 can determine the periodic sleep schedule information corresponding to the selected substitute data on the property of the selected substitute data.

In operation 1909, the processor 210 can send the third schedule change request message to the source device 1701. For example, the third schedule change request message can request the schedule change of the source device 1701. For example, the third schedule change request message can include the periodic sleep schedule information.

In operation 1911, the processor 210 can determine whether the third schedule change response message is received from the source device 1701. For example, the third schedule change response message is the response message for the third schedule change request message and can include the schedule change response (e.g., approval or rejection for the schedule change).

When receiving the third schedule change response message, the processor 210 goes to operation 1913. Otherwise, the processor 210 can repeat operation 1911.

In operation 1913, the processor 210 can determine whether the source device 1701 approves the schedule change based on the third schedule change response message. When the schedule change is approved, the processor 210 goes to operation 1919. Otherwise, the processor 210 can go to operation 1915.

In operation 1915, the processor 210 can transmit the substitute data according to the existing schedule information (e.g., the schedule information corresponding to the mirroring data). In operation 1917, the processor 210 can determine whether the display 260 is turned on. When the display 260 is turned on, the processor 210 can proceed to operation 1901. Otherwise, the processor 210 can proceed to operation 1915.

In operation 1919, the processor 210 can determine whether the message including the periodic sleep schedule information is received from the source device 1701. When receiving the message, the processor 210 goes to operation 1921. Otherwise, the processor 210 can repeat operation 1919.

In operation 1921, the processor 210 can synchronize with the source device 1701 according to the periodic sleep schedule information. For example, when the proportion of the active interval and the sleep interval of the periodic sleep schedule information is 3:7, the processor 210 can control the communication module 220 to transmit the substitute content for 3/10 hours of one period and to stop the substitute content transmission for 7/10 hours of one period.

According to an embodiment, the processor 210 can control the power of the communication module 220 according to the periodic sleep schedule information. For example, the processor 210 can control the power of the WIFI module 223 of the communication module 220 according to the periodic sleep schedule information.

In operation 1923, the processor 210 can determine whether the substitute data is received from the source device 1701. For example, the processor 210 can receive the substitute data according to the periodic sleep schedule information. When receiving the substitute data, the processor 210 goes to operation 1925. Otherwise, the processor 210 can repeat operation 1923.

In operation 1925, the processor 210 can output the substitute data. In operation 1927, the processor 210 can determine whether the display 260 is turned on. When the display 260 is turned on, the processor 210 can proceed to operation 1929. Otherwise, the processor 210 can proceed to operation 1925.

In operation 1929, the processor 210 can stop the substitute data transmission and determine the existing schedule information (e.g., the schedule information corresponding to the mirroring data).

In operation 1931, the processor 210 can send the fourth schedule change request message. For example, the fourth schedule change request message can request the schedule change of the source device 1701. For example, the fourth schedule change request message can include the existing schedule information.

In operation 1933, the processor 210 can determine whether the fourth schedule change response message is received from the source device 1701. For example, the fourth schedule change response message is the response message for the fourth schedule change request message and can include the schedule change response (e.g., approval or rejection).

Upon receiving the fourth schedule change response message, the processor 210 goes to operation 1935. Otherwise, the processor 210 can repeat operation 1933.

In operation 1935, the processor 210 can determine whether the source device 1701 approves the schedule change based on the fourth schedule change response message. When the schedule change is approved, the processor 210 goes to operation 1937. Otherwise, for example, when the schedule change is rejected, the processor 210 can send the fourth schedule change response message until the schedule change is approved in operation 1931.

In operation 1937, the processor 210 can determine whether the message including the existing schedule information is received from the source device 1701. When receiving the message, the processor 210 goes to operation 1939. Otherwise, the processor 210 can repeat operation 1937.

The processor 210 can synchronize with the source device 1701 according to the existing schedule information in operation 1939 and then proceed to operation 1901. When the proportion of the active interval and the sleep interval per period is 1:0 in the existing schedule information, the processor 210 can control the communication module 220 to continuously receive the mirroring data throughout the period. For example, the processor 210 can control the power of the communication module 220 according to the existing schedule information. For example, the processor 210 can control the power of the WIFI module 223 of the communication module 220 according to the existing schedule information.

Figure 20:
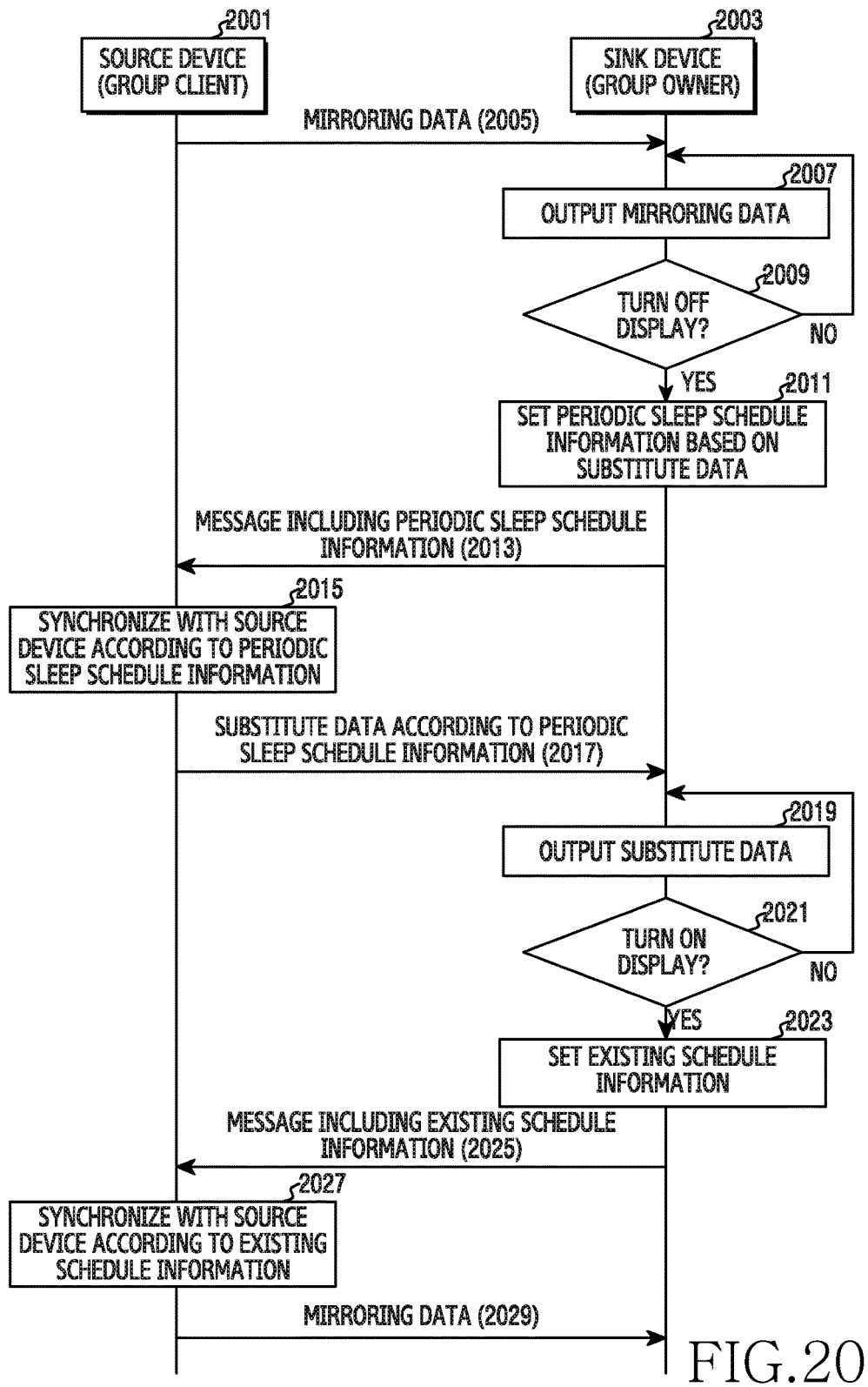
FIG. 20 illustrates a flowchart of data transmission in a communication system according to still another embodiment of the present disclosure.

FIG. 20 illustrates yet another flowchart of data transmission in a communication system according to an embodiment of the present disclosure. For example, the communication system can include a source device 2001 and a sink device 2003. For example, the source device 2001 can be the electronic device 101 of FIG. 1 or the first electronic device 401 of FIG. 4. For example, the source device 2001 can be a group client. For example, the sink device 2003 can be the external electronic device 102 of FIG. 1 or the second electronic device 403 of FIG. 4. For example, the sink device 2003 can be a group owner.

For example, the source device 2001 and the sink device 2003 can be electronic devices including a display (e.g., the display 260) and a battery (e.g., the battery 296). For example, the source device 2001 can be a smartphone, and the sink device 2003 can be a notebook including the greater display 260 than the smartphone.

Referring to FIG. 20, in operation 2005, the source device 2001 can transmit mirroring data to the sink device 2003. According to an embodiment, the source device 2001 can transmit mirroring data according to schedule information corresponding to the mirroring data. For example, the schedule information corresponding to the mirroring data can set the proportion of the active interval and the sleep interval per period to 1:0.

In operation 2007, the sink device 2003 can receive and output the mirroring data. In operation 2009, the sink device 1703 can determine whether the sink device's display (e.g., the display 260) is turned off. When the display 260 is turned off, the sink device 2003 goes to operation 2011. Otherwise, the sink device 2003 can repeat operation 2007.

In operation 2011, the sink device 2003 can set periodic sleep schedule information based on substitute data. For example, the periodic sleep schedule information can include information about the sleep interval and the active interval to periodically deactivate or activate a communication interface (e.g., the communication module 220). According to an embodiment, the sink device 2003 can select the substitute data for the mirroring data and determine the periodic sleep schedule information corresponding to the selected substitute data.

In operation 2013, the sink device 2003 can send a message including the periodic sleep schedule information to the source device 2001.

In operation 2015, the source device 2001 can synchronize with the sink device 2003 according to the periodic sleep schedule information. The source device 2001 can receive the message including the periodic sleep schedule information and synchronize the data communication period with the sink device 2003 according to the periodic sleep schedule information.

In operation 2017, the source device 2001 can transmit the substitute data to the sink device 2003 according to the periodic sleep schedule information. For example, when the proportion of the active interval and the sleep interval of the periodic sleep schedule information is 3:7, the source device 2001 can transmit the substitute data for 3/10 hours of one period and stop the substitute data transmission for 7/10 hours of one period.

In operation 2019, the sink device 2003 can receive and output the substitute data. For example, the sink device 2003 can output the substitute data instead of the mirroring data.

In operation 2021, the sink device 2003 can determine whether the display 260 is turned on. When the display 260 is turned on, the sink device 2003 can proceed to operation 2023. Otherwise, the sink device 2003 can proceed to operation 2019.

In operation 2023, the sink device 2003 can set existing schedule information (e.g., schedule information corresponding to the mirroring data). According to an embodiment, the sink device 2003 can change a data communication period according to the periodic sleep schedule information. In operation 2025, the sink device 2003 can send a message including the existing schedule information to the source device 2001.

In operation 2027, the source device 2001 can receive the message including the existing schedule information and synchronize the data communication period with the source device 2001 according to the existing schedule information.

In operation 2029, the source device 2001 can transmit mirroring data to the sink device 2003. According to an embodiment, the source device 2001 can transmit the mirroring data according to the existing schedule information.

Figure 21:
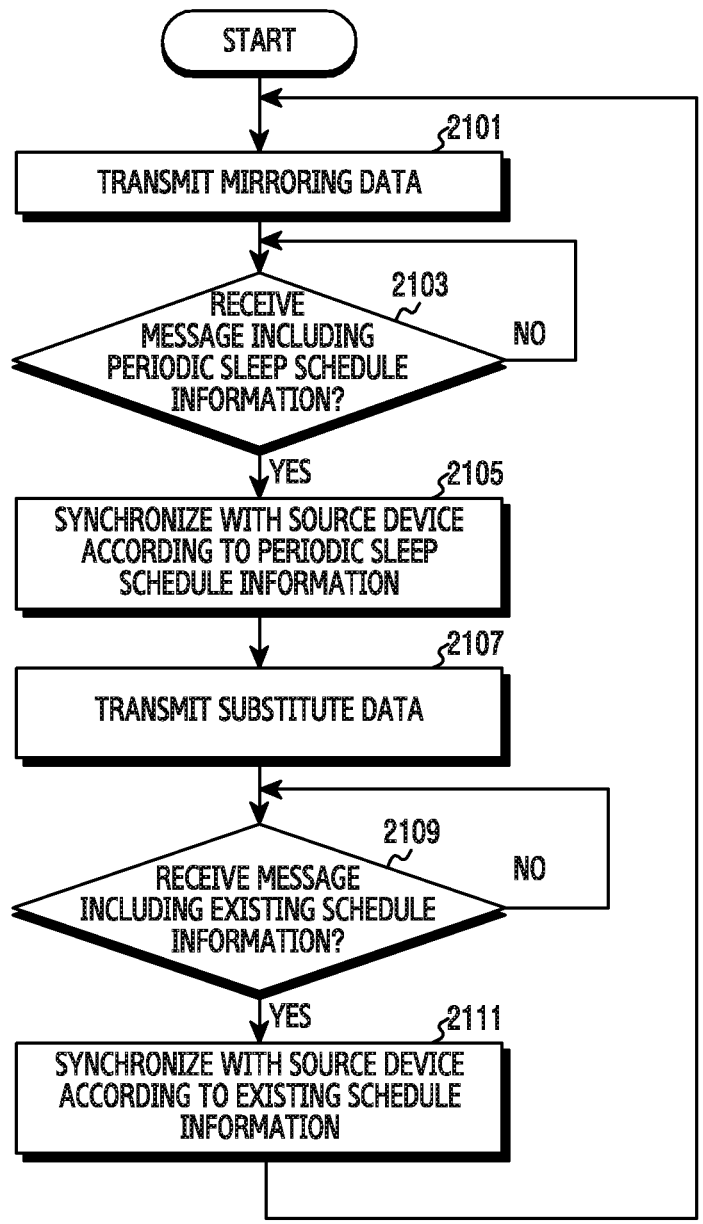
FIG. 21 illustrates a flowchart of data transmission in a source device according to still another embodiment of the present disclosure.

FIG. 21 illustrates yet another flowchart of data transmission in a source device according to an embodiment of the present disclosure. For example, the source device 2001 can be the electronic device 101 of FIG. 1 or the first electronic device 401 of FIG. 4. For example, the source device 2001 can be the group client. For example, the sink device 2003 can be the external electronic device 102 of FIG. 1 or the second electronic device 403 of FIG. 4. For example, the sink device 2003 can be the group owner.

In operation 2101, the source device 2001 (e.g., the processor 210) can transmit the mirroring data to the sink device 2003. According to an embodiment, the processor 210 can transmit the mirroring data according to the schedule information corresponding to the mirroring data.

In operation 2103, the processor 210 can determine whether the message including the periodic sleep schedule information is received from the sink device 2003. When receiving the message, the processor 210 can proceed to operation 2105. Otherwise, the processor 210 can repeat operation 2103.

In operation 2105, the processor 210 can synchronize with the sink device 2003 according to the periodic sleep schedule information. According to an embodiment, the processor 210 can control the power of the communication module 220 (e.g., the WIFI module 223) according to the periodic sleep schedule information. When the proportion of the active interval and the sleep interval per period of the existing schedule information is 3:7, the processor 210 can control the communication module 220 (e.g., the WIFI module 223) to transmit the substitute data for 3/10 hours of one period and to stop the substitute data transmission for 7/10 hours of one period.

In operation 2107, the processor 210 can transmit the substitute data to the sink device 2003. According to an embodiment, the processor 210 can transmit the substitute data according to the periodic sleep schedule information.

In operation 2109, the processor 210 can determine whether the message including the existing schedule information is received from the sink device 2003. For example, the existing schedule information can be the schedule information corresponding to the mirroring data.

When receiving the message including the existing schedule information, the processor 210 can proceed to operation 2111. Otherwise, the processor 210 can repeat operation 2109.

The processor 210 can synchronize with the sink device 2003 according to the existing schedule information in operation 2111 and then proceed to operation 2101. According to an embodiment, the processor 210 can control the power of the communication module 220 (e.g., the WIFI module 223) according to the existing sleep schedule information. When the proportion of the active interval and the sleep interval per period is 1:0 in the existing schedule information, the processor 210 can control the communication module 220 (e.g., the WIFI module 223) to continuously transmit the mirroring data throughout the period.

Figure 22:
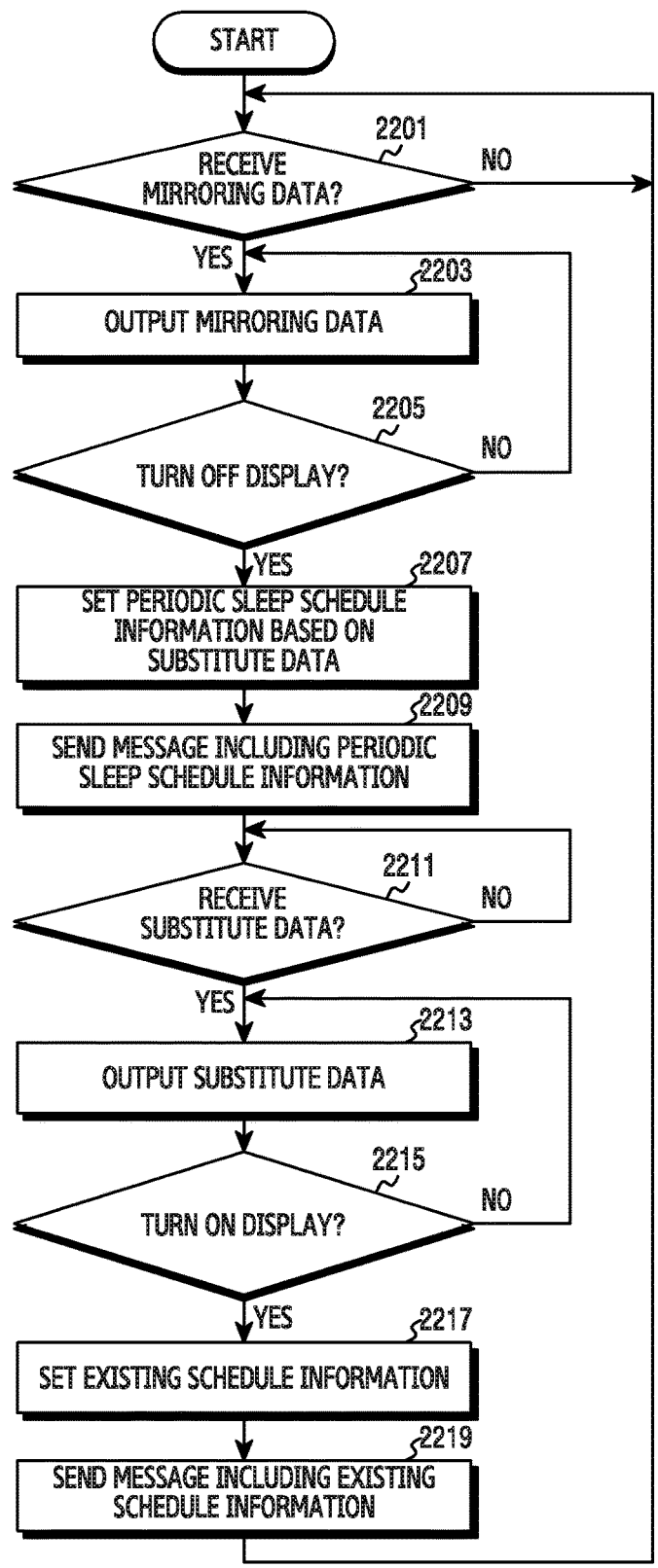
FIG. 22 illustrates flowchart of data reception in a sink device according to still another embodiment of the present disclosure.

FIG. 22 illustrates yet another flowchart of data reception in a sink device according to an embodiment of the present disclosure. For example, the source device 2001 can be the electronic device 101 of FIG. 1 or the first electronic device 401 of FIG. 4. For example, the source device 2001 can be the group client. For example, the sink device 2003 can be the external electronic device 102 of FIG. 1 or the second electronic device 403 of FIG. 4. For example, the sink device 2003 can be the group owner.

Referring to FIG. 22, in operation 2201, the sink device 2003 (e.g., the processor 210) can determine whether the mirroring data is received from the source device 2001. According to an embodiment, the processor 210 can receive the mirroring data according to the schedule information corresponding to the mirroring data.

When receiving the mirroring data, the processor 210 goes to operation 2203. Otherwise, the processor 210 can repeat operation 2201.

In operation 2203, the processor 210 can determine whether the display (e.g., the display 260) is turned off. When the display 260 is turned off, the processor 210 can proceed to operation 2207. Otherwise, the processor 210 can proceed to operation 2203.

In operation 2207, the processor 210 can determine the periodic sleep schedule information based on the substitute data. According to an embodiment, the processor 210 can select the substitute data for the mirroring data.

According to an embodiment, the processor 210 can determine the preset periodic sleep schedule information in the selected substitute data. The processor 210 can set the periodic sleep schedule information based on the property of the selected substitute data. For example, the processor 210 can select one of multiple schedule information based on the property of the selected substitute data, and determine the selected schedule information as the periodic sleep schedule information.

In operation 2209, the processor 210 can send the message including the periodic sleep schedule information to the source device 2001. According to an embodiment, the processor 210 can change the data communication period according to the periodic sleep schedule information.

In operation 2211, the processor 210 can determine whether substitute data is received from the source device 2001. According to an embodiment, the processor 210 can receive the substitute data according to the periodic sleep schedule information. Upon receiving the substitute data, the processor 210 goes to operation 2213. Otherwise, the processor 210 can repeat operation 2211.

In operation 2213, the processor 210 can output the substitute data. In operation 2215, the processor 210 can determine whether the display 260 is turned on. When the display 260 is turned on, the processor 210 goes to operation 2217. Otherwise, the processor 210 can go to operation 2213.

In operation 2217, the processor 210 can set the existing schedule information (e.g., the schedule information corresponding to the mirroring data). The processor 210 can send the message including the existing schedule information to the source device 2001 in operation 2219 and then repeat operation 2201. The processor 210 can change the data communication period according to the existing schedule information.

Figure 23:
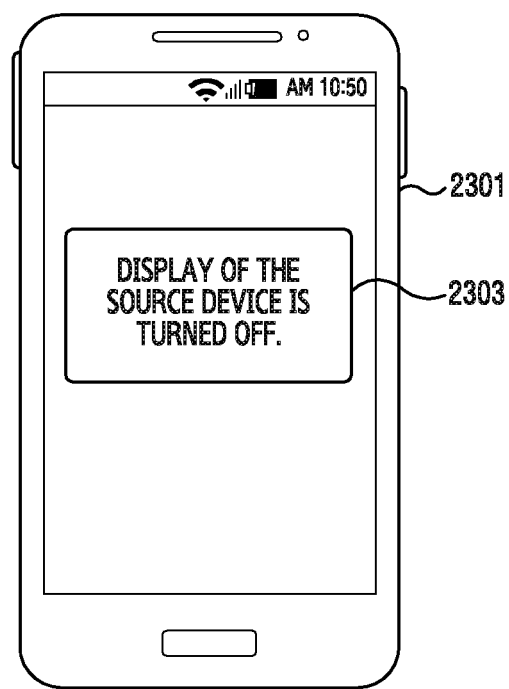
FIG. 23 illustrates a diagram of screens which output a state of an electronic device according to various embodiments of the present disclosure.
Figure 23:
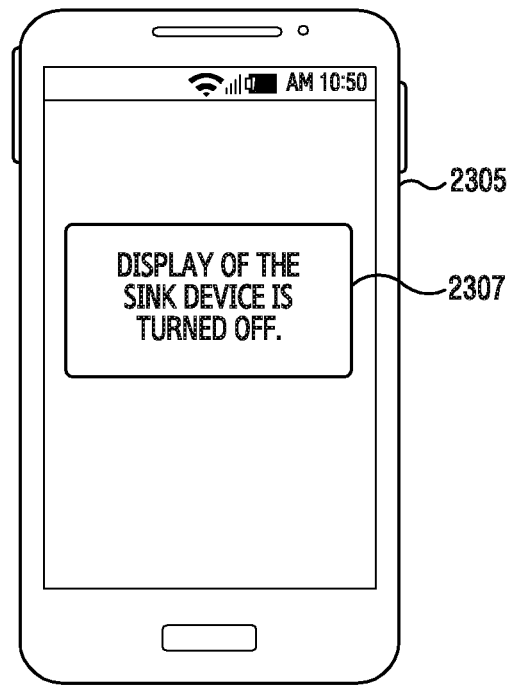

FIG. 23 illustrates screens which output a state of an electronic device according to various embodiments. For example, the electronic device can be the electronic device 101 or the external electronic device 102 of FIG. 1. For example, the electronic device can be the source device or the sink device.

According to an embodiment, the electronic device 101 can provide the mirroring service to another electronic device and concurrently output the state of the other electronic device. The electronic device 1010 can display the state of the other electronic device, output the voice, or output a combination of them.

For example, when the display of the other electronic device which is the source device is turned off, the electronic device 101 which is the sink device can receive a message (e.g., the first schedule change request message) including the state information of the source device. The electronic device 101 can display a popup window 2303 indicating the display power-off of the source device on a screen 2301 based on the received message.

For example, when the display of the other electronic device which is the sink device is turned off, the electronic device 101 which is the source device can receive a message (e.g., the third schedule change request message) including the state information of the sink device. The electronic device 101 can display a popup window 2307 indicating the display power-off of the sink device on a screen 2305 based on the received message.

According to an embodiment, the present disclosure can employ other methods than the method which minimizes the current consumption of the electronic device by changing the schedule for the data communication period in the substitute data transmission.

According to an embodiment, when the display of the sink device is turned off or the mirroring mode is switched to other mode, the sink device can release a WiFi Display (WFD) session based on the WiFi Direct and maintain the WiFi Direct connection. In so doing, since the WFD session is released, the source device can stop the mirroring data transmission.

According to an embodiment, when the WFD session is released, the source or sink device can set an arbitrary sleep schedule, synchronize with each other, and thus reduce the current consumption.

According to an embodiment, when the display of the sink device is turned on, the sink device can re-connect the WFD session and release the sleep schedule. In so doing, since the WFD session is connected, the source device can retransmit the mirroring data.

The term "module" as used in the present disclosure can imply, for example, a unit including hardware, software, or firmware, and can be interchangeably used with terms, for example, "logic", "logical block", "component", "circuit", and the like. "module" can be a minimum unit of an integral component or can be a part thereof, or minimum unit for performing one or more functions or a part thereof. "module" can be mechanically or electrically implemented. For example, "module" can include an Application-Specific Integrated Circuit (ASIC) chip, a Field-Programmable Gate Arrays (FPGAs), or a programmable-logic device, which are known or will be developed, for performing certain operations.

At least part of a device (e.g., modules or functions thereof) or a method (e.g., operations) according to various embodiments can be implemented with, for example, an instruction stored in a computer-readable storage medium as a program module. When the instruction is executed by a processor (e.g., the processor 120), the processor can perform a function corresponding to the instruction. The computer readable recording medium can include a hard disk, a floppy disk, magnetic media (e.g., a magnetic tape), optical media (e.g., a CD-ROM, a DVD), magneto-optical media (e.g., a floptical disk), and an internal memory. Also, the instruction can include machine code made by a compiler or code executable by a computer using an interpreter. A module or a program module according to various embodiments can include at least one or more of the aforementioned components, omit some of them, or further include additional other components.

Operations performed by a module, a program module, or other components according to various embodiments can be executed in a sequential, parallel, repetitive, or heuristic manner. Some operations can be executed in a different order or be omitted, or other operations can be added.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
   a display;
   an audio circuit;
   a communication interface; and
   a processor operably connected with the display and the communication interface, the processor configured to:
     connect to an external electronic device through the communication interface via a direct communication interface;
     display a first content on the display;
     transmit the first content to the external electronic device based on a first schedule to transmit the first content through the communication interface, the first schedule including only an active interval without an inactive interval, in synchronization with the electronic device for displaying playing the first content;
     detect a stop of displaying playing of the first content based on a state change of the electronic device from a first state to a second state;
     select a second content for substituting the first content;
     determine a periodic sleep schedule including an active interval and an inactive interval within at least one period to periodically activate the communication interface to transmit the second content;
     transmit the periodic sleep schedule to the external electronic device;
     transmit the second content to the external electronic device only over the active interval according to the periodic sleep schedule through the communication interface,
     detect another state change of the electronic device from the second state to the first state;
     transmit, to the external electronic device, information for indicating that a schedule for a communication has been changed to the first schedule;
     display the first content on the display; and
     transmit the first content to the external electronic device based on the first schedule in synchronization with the electronic device for displaying the first content.

2. The electronic device of claim 1, wherein the processor is further configured to determine the periodic sleep schedule such that a service quality regarding the second content satisfies a preset level.

3. The electronic device of claim 1, further comprising a memory configured to store at least a part of the second content.

4. The electronic device of claim 1, wherein the processor is further configured to detect the stop of displaying of the first content when the display is turned off.

5. The electronic device of claim 1, wherein the processor is further configured to determine the periodic sleep schedule based on at least one property of the second content.

6. The electronic device of claim 5, wherein the at least one property of the second content comprises at least one of a type, a playback rate, or a size of the second content.

7. The electronic device of claim 1, wherein the second content comprises at least one of video content or audio content.

8. The electronic device of claim 1, wherein the processor is further configured to transmit a schedule change request to the external electronic device.

9. The electronic device of claim 8, wherein the processor is further configured to receive a periodic sleep schedule of the external electronic device.

10. The electronic device of claim 9, wherein the processor is further configured to determine the periodic sleep schedule to transmit the second content based on the received periodic schedule of an external device.

11. The electronic device of claim 9, wherein the processor is further configured to synchronize the communication interface based on the received periodic sleep schedule to transmit the second content to the external electronic device.

12. The electronic device of claim 8, wherein the schedule change request includes information on the state change of the electronic device.

13. A method for operating an electronic device, the method comprising:
    connecting to an external electronic device through a communication interface of the electronic device via a direct communication interface;
    displaying a first content on a display of the electronic device;
    transmitting the first content to the external electronic device based on a first schedule to transmit the first content through the communication interface, the first schedule including only an active interval without an inactive interval in synchronization with the electronic device for displaying the first content;
    detecting a stop of displaying of the first content based on a state change of the electronic device from a first state to a second state;
    selecting a second content for substituting the first content;
    determining a periodic sleep schedule including an active interval and an inactive interval within at least one period to periodically activate the communication interface to transmit the second content;
    transmitting the periodic sleep schedule to the external electronic device;
    transmitting the second content to the external electronic device only over the active interval according to the periodic sleep schedule through the communication interface
    detecting another state change of the electronic device from the second state to the first state;
    transmitting, to the external electronic device, information for indicating that a schedule for a communication has been changed to the first schedule;
    displaying the first content on the display; and
    transmitting the first content to the external electronic device based on the first schedule in synchronization with the electronic device for displaying the first content.

14. The method of claim 13, wherein the detecting of the schedule comprises determining the periodic sleep schedule such that a service quality regarding the second content satisfies a preset level.

15. The method of claim 13, wherein at least a part of the second content is stored in the electronic device.

16. The method of claim 13, wherein detecting of the stop of displaying of the first content comprises detecting the stop of displaying of the first content when the display is turned off.

17. The method of claim 13, wherein detecting of the schedule comprises determining the periodic sleep schedule based on at least one property of the second content.

18. The method of claim 17, wherein the at least one property of the second content comprises at least one of a type, a playback rate, or a size of the second content.

19. The method of claim 13, wherein the second content comprises at least one of video content or audio content.

20. The method of claim 13, further comprising:
- transmitting a schedule change request to the external electronic device;
- receiving a periodic sleep schedule of the external electronic device; and
- synchronizing the communication interface based on the received periodic sleep schedule to transmit the second content to the external electronic device.

* * * * *